United States Patent
Boudreault et al.

(10) Patent No.: US 9,534,274 B2
(45) Date of Patent: Jan. 3, 2017

(54) METHODS FOR PURIFYING ALUMINIUM IONS

(71) Applicant: ORBITE ALUMINAE INC., St-Laurent (CA)

(72) Inventors: Richard Boudreault, St-Laurent (CA); Joël Fournier, Carignan (CA); Hubert Dumont, Laval (CA); Jean-François Samuel, Verdun (CA); Jonathan Bouffard, Montréal (CA); Sophie Lepage, Sainte-Anne-Des-Monts (CA); Ann-Christine Huard, Fossambault-Sur-Le-Lac (CA); Claudia Gravel-Rouleau, Québec (CA); Marie-Maxime Labrecque-Gilbert, Laval (CA)

(73) Assignee: ORBITE TECHNOLOGIES INC., St-Laurent (CA)

( * ) Notice: Subject to any disclaimer, the term of this patent is extended or adjusted under 35 U.S.C. 154(b) by 0 days.

(21) Appl. No.: 14/442,317

(22) PCT Filed: Nov. 14, 2013

(86) PCT No.: PCT/CA2013/000963
§ 371 (c)(1),
(2) Date: May 12, 2015

(87) PCT Pub. No.: WO2014/075173
PCT Pub. Date: May 22, 2014

(65) Prior Publication Data
US 2016/0273069 A1 Sep. 22, 2016

Related U.S. Application Data

(60) Provisional application No. 61/726,079, filed on Nov. 14, 2012.

(51) Int. Cl.
*C22B 21/00* (2006.01)
*C22B 7/02* (2006.01)
(Continued)

(52) U.S. Cl.
CPC ............. *C22B 21/0023* (2013.01); *C01F 7/02* (2013.01); *C22B 3/10* (2013.01); *C22B 3/24* (2013.01);
(Continued)

(58) Field of Classification Search
CPC ................ C22B 3/10; C22B 3/44; C22B 7/02; C22B 7/04; C22B 21/0015; C22B 21/0023; C01F 7/02
See application file for complete search history.

(56) References Cited

U.S. PATENT DOCUMENTS 558,726 A    4/1896 Gooch
650,763 A    5/1900 Raynaud
(Continued)

FOREIGN PATENT DOCUMENTS

AU    631226      2/1991
AU    4375001    12/2001
(Continued)

OTHER PUBLICATIONS

Ma, R. et al. CN 101767807 A. Published Jul. 2010. Machine translation.*
(Continued)

*Primary Examiner* — George Wyszomierski
*Assistant Examiner* — Tima M McGuthry Banks
(74) *Attorney, Agent, or Firm* — Bereskin & Parr LLP/S.E.N.C.R.L., s.r.l.

(57) ABSTRACT

There are provided processes for purifying aluminum ions. Such processes comprise precipitating the aluminum ions under the form of Al(OH)$_3$ at a first pH range; converting
(Continued)

Al(OH)$_3$ into AlCl$_3$ by reacting Al(OH)$_3$ with HCl and precipitating said AlCl$_3$; and heating the AlCl$_3$ under conditions effective for converting AlCl$_3$ into Al$_2$O$_3$ and optionally recovering gaseous HCl so-produced. The processes can also comprise converting alumina into aluminum.

20 Claims, 5 Drawing Sheets

(51) Int. Cl.
  C22B 7/04    (2006.01)
  C22B 3/10    (2006.01)
  C22B 3/44    (2006.01)
  C22B 3/24    (2006.01)
  C22B 3/42    (2006.01)
  C22B 7/00    (2006.01)
  C01F 7/02    (2006.01)

(52) U.S. Cl.
  CPC . *C22B 3/42* (2013.01); *C22B 3/44* (2013.01); *C22B 7/007* (2013.01); *C22B 7/02* (2013.01); *C22B 7/04* (2013.01); *C22B 21/0015* (2013.01)

(56) References Cited

U.S. PATENT DOCUMENTS

| | | |
|---|---|---|
| 1,494,029 A | 5/1924 | Scofield et al. |
| 1,501,873 A | 7/1924 | Tyrer |
| 1,519,880 A | 12/1924 | Heinrich et al. |
| 1,701,510 A | 2/1929 | Sieurin |
| 1,760,962 A | 6/1930 | Phillips et al. |
| 1,778,083 A | 10/1930 | Marburg |
| 1,868,499 A | 7/1932 | Guertler |
| 1,906,467 A | 5/1933 | Heath |
| 1,931,515 A | 10/1933 | Fritz et al. |
| 1,956,139 A | 4/1934 | Staufer et al. |
| 1,962,498 A | 6/1934 | Frost |
| 1,999,773 A | 4/1935 | McMichael |
| 2,024,026 A | 12/1935 | Coleman et al. |
| 2,189,376 A | 2/1940 | Burman |
| 2,354,133 A | 7/1944 | Lyons |
| 2,376,696 A | 5/1945 | Hixson et al. |
| 2,398,493 A | 4/1946 | Butt et al. |
| 2,406,577 A | 8/1946 | Alessandroni |
| 2,413,709 A | 1/1947 | Hoffman |
| 2,471,844 A | 5/1949 | Strelzoff |
| 2,473,534 A | 6/1949 | Lloyd |
| 2,489,309 A | 11/1949 | Mills et al. |
| 2,642,337 A | 6/1953 | Newsome |
| 2,648,595 A | 8/1953 | Kennedy |
| 2,663,620 A | 12/1953 | Haensel, III |
| 2,707,149 A | 4/1955 | McKinley |
| 2,722,471 A | 11/1955 | Hirsch et al. |
| 2,769,686 A | 11/1956 | Michener, Jr. et al. |
| 2,771,344 A | 11/1956 | Michel et al. |
| 2,780,525 A | 2/1957 | Wendell, Jr. et al. |
| 2,806,766 A | 9/1957 | Anderson |
| 2,815,264 A | 12/1957 | Calkins et al. |
| 2,824,783 A | 2/1958 | Peppard et al. |
| 2,848,398 A | 8/1958 | Inagaki |
| 2,914,381 A | 11/1959 | Wainer |
| 2,914,464 A | 11/1959 | Burton et al. |
| 2,992,893 A | 7/1961 | Soudan et al. |
| 3,013,859 A | 12/1961 | Kuhlman, Jr. et al. |
| 3,104,950 A | 9/1963 | Ellis |
| 3,159,452 A | 12/1964 | Lerner |
| 3,192,128 A | 6/1965 | Brandmair et al. |
| 3,211,521 A | 10/1965 | George et al. |
| 3,473,919 A | 10/1969 | Metcalfe et al. |
| 3,479,136 A | 11/1969 | Michener, Jr. et al. |
| 3,540,860 A | 11/1970 | Cochran |
| 3,545,920 A | 12/1970 | George et al. |
| 3,586,477 A | 6/1971 | Flood |
| 3,620,671 A | 11/1971 | Maurel et al. |
| 3,642,441 A | 2/1972 | Van Weert |
| 3,649,185 A | 3/1972 | Sato et al. |
| 3,658,483 A | 4/1972 | Lienau et al. |
| 3,682,592 A | 8/1972 | Kovacs |
| 3,751,553 A | 8/1973 | Oslo et al. |
| 3,816,605 A | 6/1974 | Schwandorf |
| 3,852,430 A | 12/1974 | Lienau et al. |
| 3,862,293 A | 1/1975 | Maurel et al. |
| 3,903,239 A | 9/1975 | Berkovich |
| 3,922,164 A | 11/1975 | Reid et al. |
| 3,944,648 A | 3/1976 | Solymar et al. |
| 3,946,103 A | 3/1976 | Hund |
| 3,957,504 A | 5/1976 | Ho et al. |
| 3,966,909 A | 6/1976 | Grunig et al. |
| 3,983,212 A | 9/1976 | Lowenstein et al. |
| 4,042,664 A | 8/1977 | Cardwell et al. |
| 4,045,537 A | 8/1977 | Hrishikesan |
| 4,048,285 A | 9/1977 | Szepesi et al. |
| 4,069,296 A | 1/1978 | Huang |
| 4,098,868 A | 7/1978 | Tolley |
| 4,107,281 A | 8/1978 | Reh et al. |
| 4,110,399 A | 8/1978 | Gaudernack et al. |
| 4,124,680 A | 11/1978 | Cohen et al. |
| 4,130,627 A | 12/1978 | Russ et al. |
| 4,133,677 A | 1/1979 | Matsui et al. |
| 4,158,042 A | 6/1979 | Deutschman |
| 4,172,879 A | 10/1979 | Miller et al. |
| 4,177,242 A | 12/1979 | Cohen et al. |
| 4,193,968 A | 3/1980 | Sullivan et al. |
| 4,198,231 A | 4/1980 | Gusset |
| 4,222,989 A | 9/1980 | Belsky et al. |
| 4,224,287 A | 9/1980 | Ziegenbalg et al. |
| 4,226,844 A | 10/1980 | Reh et al. |
| 4,233,273 A | 11/1980 | Meyer et al. |
| 4,237,102 A | 12/1980 | Cohen et al. |
| 4,239,735 A | 12/1980 | Eisele et al. |
| 4,241,030 A | 12/1980 | Cohen et al. |
| 4,259,311 A | 3/1981 | Shah |
| 4,297,326 A | 10/1981 | Gjelsvik et al. |
| 4,318,896 A | 3/1982 | Schoonover |
| 4,362,703 A | 12/1982 | Boybay et al. |
| 4,370,422 A | 1/1983 | Panda et al. |
| 4,378,275 A | 3/1983 | Adamson et al. |
| 4,392,987 A | 7/1983 | Laine et al. |
| 4,402,932 A | 9/1983 | Miller et al. |
| 4,414,196 A | 11/1983 | Matsumoto et al. |
| 4,435,365 A | 3/1984 | Morris |
| 4,437,994 A | 3/1984 | Baker |
| 4,465,566 A | 8/1984 | Loutfy et al. |
| 4,465,659 A | 8/1984 | Cambridge et al. |
| 4,486,393 A | 12/1984 | Baksa et al. |
| 4,490,338 A | 12/1984 | De Schepper et al. |
| 4,530,819 A | 7/1985 | Czeglédi et al. |
| 4,560,541 A | 12/1985 | Davis |
| 4,567,026 A | 1/1986 | Liosowyj |
| 4,585,645 A | 4/1986 | Sucech |
| 4,634,581 A | 1/1987 | Cambridge et al. |
| 4,652,433 A | 3/1987 | Ashworth et al. |
| 4,676,838 A | 6/1987 | Franz et al. |
| 4,710,369 A | 12/1987 | Bergman |
| 4,741,831 A | 5/1988 | Grinstead |
| 4,797,271 A | 1/1989 | Fleming et al. |
| 4,816,233 A | 3/1989 | Rourke et al. |
| 4,820,498 A | 4/1989 | Newkirk |
| 4,826,671 A | 5/1989 | Arndt et al. |
| 4,830,507 A | 5/1989 | Bagatto et al. |
| 4,898,719 A | 2/1990 | Rourke et al. |
| 4,913,884 A | 4/1990 | Feuling |
| 4,938,871 A | 7/1990 | Musikas et al. |
| 4,965,053 A | 10/1990 | Herchenroeder et al. |
| 4,968,504 A | 11/1990 | Rourke et al. |
| 4,980,141 A | 12/1990 | Kimura et al. |
| 4,988,487 A | 1/1991 | Lai et al. |
| 4,995,984 A | 2/1991 | Barkatt et al. |
| 5,006,753 A | 4/1991 | Hasker et al. |
| 5,008,089 A | 4/1991 | Moody et al. |
| 5,011,665 A | 4/1991 | Cailly et al. |

(56) References Cited

U.S. PATENT DOCUMENTS

| | | |
|---|---|---|
| 5,015,447 A | 5/1991 | Fulford et al. |
| 5,019,362 A | 5/1991 | Rourke et al. |
| 5,030,424 A | 7/1991 | Fulford et al. |
| 5,035,365 A | 7/1991 | Birmingham |
| 5,037,608 A | 8/1991 | Tarcy et al. |
| 5,039,336 A | 8/1991 | Feuling |
| 5,043,077 A | 8/1991 | Chandler et al. |
| 5,045,209 A | 9/1991 | Snyder et al. |
| 5,053,144 A | 10/1991 | Szirmai et al. |
| 5,061,474 A | 10/1991 | Pauli et al. |
| 5,071,472 A | 12/1991 | Traut et al. |
| 5,080,803 A | 1/1992 | Bagatto et al. |
| 5,091,159 A | 2/1992 | Connelly et al. |
| 5,091,161 A | 2/1992 | Harris et al. |
| 5,093,091 A | 3/1992 | Dauplaise et al. |
| 5,104,544 A | 4/1992 | Shimizu et al. |
| 5,106,797 A | 4/1992 | Allaire |
| 5,112,534 A | 5/1992 | Guon et al. |
| 5,120,513 A | 6/1992 | Moody et al. |
| 5,124,008 A | 6/1992 | Rendall et al. |
| 5,149,412 A | 9/1992 | Allaire |
| 5,160,482 A | 11/1992 | Ash et al. |
| 5,180,563 A | 1/1993 | Lai et al. |
| 5,188,809 A | 2/1993 | Crocker et al. |
| 5,192,443 A | 3/1993 | Delloye et al. |
| 5,244,649 A | 9/1993 | Ostertag et al. |
| 5,274,129 A | 12/1993 | Natale et al. |
| 5,368,736 A | 11/1994 | Horwitz et al. |
| 5,409,677 A | 4/1995 | Zinn |
| 5,409,678 A | 4/1995 | Smith et al. |
| 5,433,931 A | 7/1995 | Bosserman |
| 5,443,618 A | 8/1995 | Chapman |
| 5,492,680 A | 2/1996 | Odekirk |
| 5,500,043 A | 3/1996 | Harada et al. |
| 5,505,857 A | 4/1996 | Misra et al. |
| 5,512,256 A | 4/1996 | Bray et al. |
| 5,531,970 A | 7/1996 | Carlson |
| 5,585,080 A | 12/1996 | Andersen et al. |
| 5,597,529 A | 1/1997 | Tack |
| 5,622,679 A | 4/1997 | Yuan et al. |
| 5,632,963 A | 5/1997 | Schwab et al. |
| 5,639,433 A | 6/1997 | Yuan et al. |
| 5,645,652 A | 7/1997 | Okinaka et al. |
| 5,665,244 A | 9/1997 | Rothenberg et al. |
| 5,720,882 A | 2/1998 | Stendahl et al. |
| 5,723,097 A | 3/1998 | Barnett et al. |
| 5,766,478 A | 6/1998 | Smith et al. |
| 5,787,332 A | 7/1998 | Black et al. |
| 5,792,330 A | 8/1998 | Petersen et al. |
| 5,795,482 A | 8/1998 | Ehle et al. |
| 5,876,584 A | 3/1999 | Cortellini |
| 5,885,545 A | 3/1999 | Pitzer |
| 5,904,856 A | 5/1999 | Kvant et al. |
| 5,911,967 A | 6/1999 | Ruthner |
| 5,922,403 A | 7/1999 | Tecle |
| 5,942,199 A | 8/1999 | Jokinen et al. |
| 5,955,042 A | 9/1999 | Barnett et al. |
| 5,962,125 A | 10/1999 | Masaki |
| 5,993,758 A | 11/1999 | Nehari et al. |
| 5,997,828 A | 12/1999 | Rendall |
| 6,033,579 A | 3/2000 | Riemer et al. |
| 6,045,631 A | 4/2000 | Tarcy et al. |
| 6,077,486 A | 6/2000 | Spitzer |
| 6,093,376 A | 7/2000 | Moore |
| 6,153,157 A | 11/2000 | McLaughlin |
| 6,214,306 B1 | 4/2001 | Aubert et al. |
| 6,221,233 B1 | 4/2001 | Rendall |
| 6,238,566 B1 | 5/2001 | Yoshida et al. |
| 6,248,302 B1 | 6/2001 | Barnett et al. |
| 6,254,782 B1 | 7/2001 | Kreisler |
| 6,267,936 B1 | 7/2001 | Delmas et al. |
| 6,302,952 B1 | 10/2001 | Mobbs et al. |
| 6,309,441 B1 | 10/2001 | Benz et al. |
| 6,312,653 B1 | 11/2001 | Delmau et al. |
| 6,337,061 B1 | 1/2002 | Iyatomi et al. |
| 6,348,154 B1 | 2/2002 | Stewart |
| 6,383,255 B1 | 5/2002 | Sundkvist |
| 6,395,062 B2 | 5/2002 | Olafson et al. |
| 6,395,242 B1 | 5/2002 | Allen et al. |
| 6,406,676 B1 | 6/2002 | Sundkvist |
| 6,447,738 B1 | 9/2002 | Rendall et al. |
| 6,468,483 B2 | 10/2002 | Barnett et al. |
| 6,500,396 B1 | 12/2002 | Lakshmanan et al. |
| 6,524,549 B1 | 2/2003 | Mohri et al. |
| 6,565,733 B1 | 5/2003 | Sportel et al. |
| 6,576,204 B2 | 6/2003 | Johansen |
| 6,716,353 B1 | 4/2004 | Mirzadeh et al. |
| 6,843,970 B1 | 1/2005 | Hard |
| 6,893,474 B2 | 5/2005 | Jäfverström et al. |
| 7,090,809 B2 | 8/2006 | Harel et al. |
| 7,118,719 B2 | 10/2006 | Fugleberg |
| 7,182,931 B2 | 2/2007 | Turnbaugh, Jr. et al. |
| 7,220,394 B2 | 5/2007 | Sreeram et al. |
| 7,282,187 B1 | 10/2007 | Brown et al. |
| 7,294,319 B2 | 11/2007 | Lahtinen et al. |
| 7,381,690 B1 | 6/2008 | Ding et al. |
| 7,442,361 B1 | 10/2008 | Gloeckler et al. |
| 7,498,005 B2 | 3/2009 | Yadav |
| 7,651,676 B2 | 1/2010 | Beaulieu et al. |
| 7,781,365 B2 | 8/2010 | Okamoto |
| 7,837,961 B2 | 11/2010 | Boudreault et al. |
| 7,892,426 B2 | 2/2011 | Hayashi et al. |
| 7,906,097 B2 | 3/2011 | Beaulieu et al. |
| 7,972,412 B2 | 7/2011 | Bergeron et al. |
| 8,038,969 B2 | 10/2011 | Kondo et al. |
| 8,147,795 B2 | 4/2012 | Dolling et al. |
| 8,216,532 B1 | 7/2012 | Vierheilig |
| 8,241,594 B2 | 8/2012 | Boudreault et al. |
| 8,287,826 B2 | 10/2012 | Pettey |
| 8,337,789 B2 | 12/2012 | Boudreault et al. |
| 8,568,671 B2 | 10/2013 | Guo et al. |
| 8,597,600 B2 | 12/2013 | Boudreault et al. |
| 9,023,301 B2 | 5/2015 | Boudreault et al. |
| 9,150,428 B2 | 10/2015 | Boudreault et al. |
| 9,181,603 B2 | 11/2015 | Boudreault et al. |
| 2002/0014416 A1 | 2/2002 | Van Weert |
| 2002/0050230 A1 | 5/2002 | Meisen |
| 2002/0071802 A1 | 6/2002 | Fulton et al. |
| 2003/0075021 A1 | 4/2003 | Young et al. |
| 2003/0152502 A1 | 8/2003 | Lewis et al. |
| 2003/0183043 A1 | 10/2003 | Wai et al. |
| 2004/0042945 A1 | 3/2004 | Rao et al. |
| 2004/0062695 A1 | 4/2004 | Horwitz et al. |
| 2005/0166706 A1 | 8/2005 | Withers et al. |
| 2006/0018813 A1 | 1/2006 | Bray |
| 2006/0066998 A1 | 3/2006 | Ishiguro |
| 2007/0062669 A1 | 3/2007 | Song et al. |
| 2007/0278106 A1 | 12/2007 | Shaw |
| 2008/0047395 A1 | 2/2008 | Liu et al. |
| 2008/0069748 A1 | 3/2008 | Lien et al. |
| 2008/0115627 A1 | 5/2008 | Wang et al. |
| 2008/0286182 A1 | 11/2008 | Costa et al. |
| 2009/0241731 A1 | 10/2009 | Pereira et al. |
| 2009/0272230 A1 | 11/2009 | Mackowski et al. |
| 2010/0018347 A1 | 1/2010 | Holden et al. |
| 2010/0078382 A1 | 4/2010 | Naganawa et al. |
| 2010/0129277 A1 | 5/2010 | Kondo et al. |
| 2010/0150799 A1 | 6/2010 | Boudreault et al. |
| 2010/0160144 A1 | 6/2010 | Kim et al. |
| 2010/0260640 A1 | 10/2010 | Shindo et al. |
| 2010/0278720 A1 | 11/2010 | Wong et al. |
| 2010/0319491 A1 | 12/2010 | Sugahara et al. |
| 2010/0329970 A1 | 12/2010 | Lian et al. |
| 2011/0017020 A1 | 1/2011 | Homma et al. |
| 2011/0044869 A1 | 2/2011 | Boudreault et al. |
| 2011/0120267 A1 | 5/2011 | Roche |
| 2011/0182786 A1 | 7/2011 | Burba, III |
| 2012/0073407 A1 | 3/2012 | Drinkard, Jr. et al. |
| 2012/0237418 A1 | 9/2012 | Boudreault et al. |
| 2013/0052103 A1 | 2/2013 | Boudreault et al. |
| 2013/0233130 A1 | 9/2013 | Boudreault et al. |
| 2014/0065038 A1 | 3/2014 | Boudreault et al. |
| 2014/0286841 A1 | 9/2014 | Boudreault et al. |
| 2014/0301920 A1 | 10/2014 | Boudreault et al. |

(56) References Cited

U.S. PATENT DOCUMENTS

| | | | |
|---|---|---|---|
| 2014/0341790 | A1 | 11/2014 | Kasaini |
| 2014/0356262 | A1 | 12/2014 | Ruth et al. |
| 2014/0369904 | A1 | 12/2014 | Boudreault et al. |
| 2014/0369907 | A1 | 12/2014 | Boudreault et al. |
| 2014/0373683 | A1 | 12/2014 | Boudreault et al. |
| 2015/0104361 | A1 | 4/2015 | Boudreault et al. |
| 2015/0159239 | A1 | 6/2015 | Boudreault et al. |
| 2015/0218720 | A1 | 8/2015 | Picard et al. |
| 2015/0225808 | A1 | 8/2015 | Boudreault et al. |
| 2015/0307965 | A1 | 10/2015 | Boudreault et al. |

FOREIGN PATENT DOCUMENTS

| | | | |
|---|---|---|---|
| CA | 1066872 | | 11/1979 |
| CA | 1088961 | | 11/1980 |
| CA | 1136380 | | 11/1982 |
| CA | 1176470 | | 10/1984 |
| CA | 1224327 | | 7/1987 |
| CA | 1226719 | | 9/1987 |
| CA | 2027519 | | 4/1991 |
| CA | 2027973 | | 4/1991 |
| CA | 2029623 | | 5/1991 |
| CA | 2036058 | | 8/1991 |
| CA | 2097809 | | 7/1992 |
| CA | 2137249 | | 12/1993 |
| CA | 2122364 | | 2/1994 |
| CA | 2156295 | | 9/1994 |
| CA | 2160488 | | 11/1994 |
| CA | 2193726 | | 1/1996 |
| CA | 2159534 | | 4/1996 |
| CA | 2167890 | | 7/1996 |
| CA | 2240067 | | 6/1997 |
| CA | 2251433 | | 4/1999 |
| CA | 2360447 | | 8/2000 |
| CA | 2306015 | | 12/2000 |
| CA | 2309225 | | 12/2000 |
| CA | 2377600 | | 1/2001 |
| CA | 2317692 | | 3/2001 |
| CA | 2391394 | | 5/2001 |
| CA | 2400673 | | 8/2001 |
| CA | 2429889 | | 6/2002 |
| CA | 2431466 | | 6/2002 |
| CA | 2433448 | | 7/2002 |
| CA | 2189631 | | 11/2002 |
| CA | 2454812 | | 2/2003 |
| CA | 2468885 | | 7/2003 |
| CA | 2471179 | | 7/2003 |
| CA | 2378721 | | 9/2003 |
| CA | 2484134 | | 11/2003 |
| CA | 2514830 | | 8/2004 |
| CA | 2467288 | | 11/2004 |
| CA | 2548225 | | 11/2004 |
| CA | 2531913 | | 1/2005 |
| CA | 2385775 | | 5/2005 |
| CA | 2556613 | | 8/2005 |
| CA | 2572190 | | 1/2006 |
| CA | 2597440 | | 8/2006 |
| CA | 2521817 | | 3/2007 |
| CA | 2624612 | | 4/2007 |
| CA | 2629167 | | 5/2007 |
| CA | 2639796 | | 6/2007 |
| CA | 2636379 | | 7/2007 |
| CA | 2641919 | | 8/2007 |
| CA | 2538962 | | 9/2007 |
| CA | 2608973 | | 1/2008 |
| CA | 2610918 | | 2/2008 |
| CA | 2659449 | | 2/2008 |
| CA | 2684696 | | 11/2008 |
| CA | 2685369 | | 11/2008 |
| CA | 2711013 | | 11/2008 |
| CA | 2697789 | | 3/2009 |
| CA | 2725391 | | 11/2009 |
| CA | 2678724 | | 3/2010 |
| CA | 2745572 | | 7/2010 |
| CA | 2747370 | | 7/2010 |
| CA | 2667029 | | 11/2010 |
| CA | 2667033 | | 11/2010 |
| CA | 2678276 | | 3/2011 |
| CA | 2773571 | | 3/2011 |
| CA | 2788965 | | 8/2011 |
| CA | 2797561 | | 11/2011 |
| CA | 2834356 | | 12/2012 |
| CA | 2884787 | | 4/2013 |
| CA | 2860491 | | 8/2013 |
| CN | 1099424 | | 3/1995 |
| CN | 1923730 | | 3/2007 |
| CN | 101767807 | A * | 7/2010 |
| CN | 101773925 | | 7/2010 |
| CN | 101792185 | | 8/2010 |
| CN | 102849765 | | 1/2013 |
| CN | 102849767 | | 1/2013 |
| CN | 103420405 | | 12/2013 |
| DE | 19903011 | | 8/2000 |
| EP | 157503 | | 10/1985 |
| EP | 0054976 | | 7/1986 |
| EP | 0238185 | | 9/1987 |
| EP | 0279672 | | 8/1988 |
| EP | 0327234 | | 8/1989 |
| EP | 0382383 | | 8/1990 |
| EP | 0399786 | | 11/1990 |
| EP | 508676 | | 10/1992 |
| EP | 466338 | | 12/1995 |
| EP | 0449942 | | 4/1996 |
| EP | 0775753 | | 5/1997 |
| EP | 0829454 | | 3/1998 |
| EP | 0692035 | | 4/1998 |
| EP | 0834584 | | 4/1998 |
| EP | 999185 | | 5/2000 |
| EP | 1496063 | | 1/2005 |
| EP | 2241649 | | 10/2010 |
| EP | 2298944 | | 3/2011 |
| FR | 2319579 | | 2/1977 |
| FR | 2600635 | | 12/1987 |
| GB | 120035 | | 3/1919 |
| GB | 153500 | | 11/1920 |
| GB | 159086 | | 2/1921 |
| GB | 195295 | | 3/1923 |
| GB | 230916 | | 3/1925 |
| GB | 240834 | | 5/1926 |
| GB | 241184 | | 5/1926 |
| GB | 273999 | | 7/1927 |
| GB | 409710 | | 5/1934 |
| GB | 470305 | | 8/1937 |
| GB | 480921 | | 3/1938 |
| GB | 484136 | | 5/1938 |
| GB | 490099 | | 8/1938 |
| GB | 574818 | | 1/1946 |
| GB | 745601 | | 2/1956 |
| GB | 798750 | | 7/1958 |
| GB | 857245 | | 12/1960 |
| GB | 858026 | | 1/1961 |
| GB | 1021326 | | 3/1966 |
| GB | 1056488 | | 1/1967 |
| GB | 1307319 | | 2/1973 |
| GB | 2013164 | | 8/1979 |
| GB | 1552918 | | 9/1979 |
| GB | 2018230 | | 10/1979 |
| GB | 2238813 | | 6/1991 |
| JP | 05287405 | | 11/1993 |
| JP | 6056429 | | 3/1994 |
| OA | 010034 | | 10/1996 |
| WO | 8603521 | | 6/1986 |
| WO | 9103424 | | 3/1991 |
| WO | 9213637 | | 8/1992 |
| WO | 9313017 | | 7/1993 |
| WO | 9418122 | | 8/1994 |
| WO | 9600698 | | 1/1996 |
| WO | 9621619 | | 7/1996 |
| WO | 9624555 | | 8/1996 |
| WO | 9722554 | | 6/1997 |
| WO | 0017408 | | 3/2000 |
| WO | 0104366 | | 1/2001 |
| WO | 2004056468 | | 7/2004 |
| WO | 2004056471 | | 7/2004 |

(56) References Cited

FOREIGN PATENT DOCUMENTS

| | | |
|---|---|---|
| WO | 2004101833 | 11/2004 |
| WO | 2005123591 | 12/2005 |
| WO | 2006084682 | 8/2006 |
| WO | 2007074207 | 7/2007 |
| WO | 2007079532 | 7/2007 |
| WO | 2008067594 | 6/2008 |
| WO | 2008104250 | 9/2008 |
| WO | 2008141423 | 11/2008 |
| WO | 2008154995 | 12/2008 |
| WO | 2009085514 | 7/2009 |
| WO | 2009153321 | 12/2009 |
| WO | 2010002059 | 1/2010 |
| WO | 2010009512 | 1/2010 |
| WO | 2010056742 | 5/2010 |
| WO | 2010079369 | 7/2010 |
| WO | 2010133284 | 11/2010 |
| WO | 2011025440 | 3/2011 |
| WO | 2011094858 | 8/2011 |
| WO | 2011100820 | 8/2011 |
| WO | 2011100821 | 8/2011 |
| WO | 2011147867 | 12/2011 |
| WO | 2014029031 | 2/2012 |
| WO | 2012126092 | 9/2012 |
| WO | 2012145797 | 11/2012 |
| WO | 2012149642 | 11/2012 |
| WO | 2013037054 | 3/2013 |
| WO | 2013142957 | 10/2013 |
| WO | 2014047728 | 4/2014 |
| WO | 2014075173 | 5/2014 |
| WO | 2014094155 | 6/2014 |
| WO | 2014094157 | 6/2014 |
| WO | 2014124539 | 8/2014 |
| WO | 2015179973 | 12/2015 |

OTHER PUBLICATIONS

An English translation of Zhang et al., "Research on the Kinetics of Alumina from Kaolinite Leaching in Sulphuric Acid", Journal of Hefei University of Technology, vol. 24, No. 1, Feb. 2001, pp. 71-74.

An English translation of Zhang et al., "Research of the Controlling Steps of the Reaction of Kaolin and Hydrochloric Acid", Journal of Hefei University of Technology, vol. 21, No. 1, Feb. 1998, pp. 50-53.

An English translation of Zhang et al., "Kinetics Research on Alumina in Kaolinite Leached by Hydrochloric Acid", Journal of Hefei University of Technology, vol. 22, No. 2, Apr. 1999, pp. 33-36.

Certification of translation from Park IP Translations dated May 14, 2012.

An English Abstract of CN101450811 "Method for extracting alumina from coal gangue", published on Jun. 10, 2009.

An English Abstract of JP2001162108 "Method for Manufacturing Iron-Aluminum Combined Flocculant", published on Jun. 19, 2001.

English Translation of Abstract of CN101462757, "Preparation of nano Na-beat-alumina powder", Jun. 24, 2009.

An English Abstract of JP57145027 "Preparation of Granular Alumina", published on Sep. 7, 1982.

An English Abstract of CA1065068 "Method of Selectively Precipitating Metals From Solutions", published on Oct. 23, 1979.

English Translation of Abstract of CN101289705, "Process for abstracting vanadium from iron-smeltin waste slag of vanadium-containing iron ore", Jul. 14, 2010.

English Translation of Abstract of CN102220487, "Method for extracting vanadium and aluminum from vanadium-containing stone coal and clay vanadium ore", Oct. 19, 2011.

English Translation of Abstract of CN102241410, "Ecological and Comprehensive Utilization Method of Coal Ash", Nov. 16, 2011.

English Translation of Abstract of RU2363748, "Method of Producing Aluminium", Aug. 10, 2009.

English Translation of Abstract of ES2194586, "Separation procedure for contaminatory metals present in acid solutions involves liquid-liquid extraction with mixtures based on phosphonated dialkyl alkyl, trialkyl phosphates and acid phosphates", Mar. 1, 2005.

English Translation of Abstract of W02009005115, "Composition for promotion of reduction in size of adipocyte", Jan. 8, 2009.

English Translation of Abstract of CN101434484, "Processes for producing alumina ceramic valve body and use thereof", May 20, 2009.

English Translation of Abstract of CN101045543, "Method for preparing sheet alumina using coal series kaolin rock or flyash as raw material", Oct. 3, 2007.

English Translation of Abstract of CN101249965, "Method for preparing ultra-fine white carbon black and nano alumina by using kaolinite as raw material", Aug. 27, 2008.

English Translation of Abstract of CN101045538, "Method for preparing modified silicon oxide using coal series kaolin rock or flyash", Oct. 3, 2007.

Gunner et al., Abstract of "Extraction of iron compounds from wood from the Vasa", Department of Chemistry, Swedish University of Agricultural Sciences, vol. 60, No. 6, pp. 678-684, 2006.

Elmolla et al., "Effect of Photo-Fenton Operating Conditions on the Performance of Photo-Fenton-SBR Process for Recalcitrant Wastewater Treatment", Journal of Applied Sciences 10 (24): 3236-3242, 2010.

Cohen et al., "Precipitation of iron from concentrated chloride solutions: Literature observations, challenges and preliminary experimental results", Minerals Engineering 18 (2005), pp. 1344-1347.

Tceisele, "Primary Metal Production", Dec. 3, 2007.

US EPA, "Alumina & Aluminum", Office of Resource Conservation and Recovery, Apr. 2, 2012.

Cablik, "Characterization and applications of red mud from bauxite processing", VSB-Technical University of Ostrava, Faculty of Mining and Geology, pp. 27-37, 2007.

Wahab et al., "Alumina Recovery From Iraqi Kaolinitic Clay by Hydrochloric Acid Route", Iraqi Bulletin of Geology and Mining, vol. 2, No. 1, 2006, pp. 67-76.

Abstract of Dash et al., "Acid dissolution of alumina from waste aluminium dross", Hydrometallurgy, vol. 92, issues 1-2, May 2008, pp. 48-53.

Khan et al., "Production of Aluminum Sulphate from Indigenous Bauxite without Precalcination of the Ore", Jour. Chem Soc. Pak., vol. 17, No. 4, pp. 213-216, 1995.

Sahoo et al., "Characterization of γ- and α-Fe2O3 nano powders synthesized by emulsion precipitation-calcination route and rheological behavior of α-Fe2O3", International Journal of Engineering, Science and Technology, vol. 2, No. 8, pp. 118-126, 2010.

Bharathi et al., "Highly mesoporous αa-Fe2O3 nanostructures: preparation, characterization and improved photocatalytic performance towards Rhodamine B (RhB)", J. Phys. D: Appl. Phys. 43 015501, pp. 1-9, 2010.

"Industrial Inorganic Pigments", Wiley—VCH Verlag GmbH and Co. KgaA, pp. 105-112, 1993.

Andrieux et al., Abstract of: "Hydrothermal synthesis of dioctahedral smectites: The Al-Fe3+ chemical series: Part I: Influence of experimental conditions", Universite de Poitiers, 2009.

Bazin et al., "Alumina from clays", Department of Mining, Metallurgical and Materials Engineering; Alcan International Limitee; Groupe Conseil PROCD Inc.; Conseil de Developpement economique de Murdochville, pp. 24-38, 2005.

Aleksandrovich, "The receipt of alumina from clay materials", 2011.

Copson et al., "Extraction of Alumina from Clays by the Lime-sinter Modification of the Pedersen Process", New York Meeting, Feb. 1944, pp. 241-254.

Al-Zahrani et al., "Extraction of Alumina from Local Clays by Hydrochloric Acid Process", JKAU: Eng. Sci., vol. 20, No. 2, pp. 29-41, 2009.

Dutrizac et al., "The Precipitation of Hematite from Ferric Chloride Media at Atmospheric Pressure", Mining and Mineral Sciences Laboratories, vol. 30B, Dec. 1999, pp. 993-1001.

(56) References Cited

OTHER PUBLICATIONS

Riveros et al., "The precipitation of hematite from ferric chloride media", Mining and Mineral Sciences Laboratories, Hydrometallurgy 46 (1997), pp. 85-104.
Smirnov, V., "Alumina production in Russia Part I: Historical background", Journal of Materials, vol. 48, Issue 8, 1996, pp. 24-26.
Wei, X. et al., "Recovery of Iron and Aluminium from Acid Mine Drainage by selective precipitation", Environmental Engineering Science, vol. 22, No. 6, 2005, pp. 745-755.
Ajemba et al., "Application of the Shrinking Core Model to the Analysis of Alumina Leaching From Ukpor Clay Using Nitric Acid", International Journal of Engineering Research & Technology (IJERT), ISSN: 2278-0181, vol. 1 Issue 3, May-2012.
Zhou et al., "Extraction of Scandium from red mud by modified activated carbon and kinetics study", Rare Metals, vol. 27, No. 3, Jun. 2008, pp. 223-227.
Wang et al., "A novel recovery process of metal values from the cathode active materials of the lithium-ion secondary batteries", Hydrometallurgy 99 (2009) 194-201.
Yatsenko et al., "Red Mud Pulp Carbonization with Scandium Extraction during alumina Production", ISSN 0040-5795, Theoretical Foundations of Chemical Engineering, 2010, vol. 44, No. 4, pp. 563-568.
Ouellet, Dissertation 9689, (Extraction de l'alumine de l'argile de la région de Murdochville, Québec, Canada), "Extraction of Alumina from Clay in the Murdochville region of Quebec", Canada—Universite Laval—Original French Version, Oct. 2004.
Ouellet, Dissertation 9689, (Extraction de l'alumine de l'argile de la région de Murdochville, Québec, Canada), "Extraction of Alumina from Clay in the Murdochville region of Quebec", Canada—Universite Laval—English Translation, Oct. 2004.
Translator Certification—Sep. 10, 2012.
Wang et al., "Recovery of scandium from synthetic red mud leach solutions by solvent extraction with D2EHPA", Separation and Purification Technology (2013), pp. 1-14.
Andritz Metals, "Regeneration Systems for Hydrochloric Waste Pickling Solutions", 2011.
Aluminium for Future Generations, "Bauxite Residual Management", http://bauxite.world-aluminium.org/refining/bauxite-residue-management.html.
Vedanta Aluminium Limited, Lanjigarh, "Red Mud Filtration and Recovery of Valuable Metals", 2001, http://marvels.engineeringwatch.in/eea025/.
English Abstract BE1019347, "Hydrometallurgical Reactor", published on Jun. 5, 2012.
Abstract Kao et al., "Solvent extraction of La(III) and Nd(III) from nitrate solutions with 2-ethylhexylphosphonic acid mono-2-ethylhexyl ester", Chemical Engineering Journal, vol. 119, Issues 2-3, Jun. 15, 2006, pp. 167-174.
English Abstract CN102690954, "Back extraction and removement method for aluminium", published on Sep. 26, 2012.
English Abstract CN101781719, "Method for recovering rare earth from oil shale waste slag", published on Jul. 21, 2010.
English Abstract CN102643985, "Method for extracting valuable metals from high-iron bauxite with step-by-step acid leaching", published on Aug. 22, 2012.
English Abstract CN102628105, "Method for comprehensively recycling and using baric waste slag in refined aluminum production process", published on Aug. 8, 2012.
English Abstract of WO 2007122720, published on Nov. 1, 2007.
English Abstract of WO 2004085719, published on Oct. 7, 2004.
English Abstract of SU 1 734 395, published on Oct. 27, 1996.
English Abstract of RU2416655, published on Apr. 20, 2011.
English Abstract of RU2008113385, published on Oct. 20, 2009.
English Abstract of RU2361941, published on Jul. 20, 2009.
English Abstract of RU2257348, published on Jul. 27, 2005.
English Abstract of RU2247788, published on Mar. 10, 2005.
English Abstract of RU2236375, published on Sep. 20, 2004.
English Abstract of RU2205242, published on May 27, 2003.
English Abstract of RU2201988, published on Apr. 10, 2003.
English Abstract of RU2196184, published on Jan. 10, 2003.
English Abstract of RU2189358, published on Sep. 20, 2002.
English Abstract of RU2176680, published on Dec. 10, 2001.
English Abstract of RU2162898, published on Feb. 10, 2001.
English Abstract of RU2162112, published on Jan. 20, 2001.
English Abstract of RU2158170, published on Oct. 27, 2000.
English Abstract of RU2147623, published on Apr. 20, 2000.
English Abstract of RU2147622, published on Apr. 20, 2000.
English Abstract of RU2140998, published on Nov. 10, 1999.
English Abstract of RU2119816, published on Oct. 10, 1998.
English Abstract of KR20070028987, published on Mar. 13, 2007.
English Abstract of JP9324227, published on Dec. 16, 1997.
English Abstract of JP9324192, published on Dec. 16, 1997.
English Abstract of JP9291320, published on Nov. 11, 1997.
English Abstract of JP9249672, published on Sep. 22, 1997.
English Abstract of JP9248463, published on Sep. 22, 1997.
English Abstract of JP9208222, published on Aug. 12, 1997.
English Abstract of JP9194211, published on Jul. 29, 1997.
English Abstract of JP9176756, published on Jul. 8, 1997.
English Abstract of JP9143589, published on Jun. 3, 1997.
English Abstract of JP8232026, published on Sep. 10, 1996.
English Abstract of JP5051208, published on Mar. 2, 1993.
English Abstract of JP4198017, published on Jul. 17, 1992.
English Abstract of JP4183832, published on Jul. 30, 1992.
English Abstract of JP4046660, published on Feb. 17, 1992.
English Abstract of JP3173725, published on Jul. 29, 1991.
English Abstract of JP2179835, published on Jul. 12, 1990.
English Abstract of JP2080530, published on Mar. 20, 1990.
English Abstract of JP2011116622, published on Jun. 16, 2011.
English Abstract of JP2011046588, published on Mar. 10, 2011.
English Abstract of JP2010270359, published on Dec. 2, 2010.
English Abstract of JP2008194684, published on Aug. 28, 2008.
English Abstract of JP2007327126, published on Dec. 20, 2007.
English Abstract of JP2007254822, published on Oct. 4, 2007.
English Abstract of JP2006348359, published on Dec. 28, 2006.
English Abstract of JP2006028187, published on Feb. 2, 2006.
English Abstract of JP2005139047, published on Jun. 2, 2005.
English Abstract of JP2000313928, published on Nov. 14, 2000.
English Abstract of JP10158629, published on Jun. 16, 1998.
English Abstract of JP10121164, published on May 12, 1998.
English Abstract of EP1817437, published on Aug. 15, 2007.
English Abstract of CN2292806, published on Sep. 30, 1998.
English Abstract of CN1986895, published on Jun. 27, 2007.
English Abstract of CN1796608, published on Jul. 5, 2006.
English Abstract of CN1699609, published on Nov. 23, 2005.
English Abstract of CN1410599, published on Apr. 16, 2003.
English Abstract of CN1397653, published on Feb. 19, 2003.
English Abstract of CN1192479, published on Sep. 9, 1998.
English Abstract of CN1478600, published on Mar. 3, 2004.
English Abstract of CN1140148, published on Jan. 15, 1997.
English Abstract of CN1127791, published on Jul. 31, 1996.
English Abstract of CN1131200, published on Sep. 18, 1996.
English Abstract of CN1061246, published on May 20, 1992.
English Abstract of CN1043752, published on Jul. 11, 1990.
English Abstract of CN102153128, published on Aug. 17, 2011.
English Abstract of CN102139943, published on Aug. 3, 2011.
English Abstract of CN102127641, published on Jul. 20, 2011.
English Abstract of CN102071317, published on May 25, 2011.
English Abstract of CN102071315, published on May 25, 2011.
English Abstract of CN102061392, published on May 18, 2011.
English Abstract of CN102030355, published on Apr. 27, 2011.
English Abstract of CN102021343, published on Apr. 20, 2011.
English Abstract of CN102011010, published on Apr. 13, 2011.
English Abstract of CN101824555, published on Sep. 8, 2010.
English Abstract of CN1045812, published on Oct. 3, 1990.
English Abstract of CN101407879, published on Apr. 15, 2009.
English Abstract of CN101307384, published on Nov. 19, 2008.
English Abstract of CN101161834, published on Apr. 16, 2008.
English Abstract of CN1844421, published on Oct. 11, 2006.
English Abstract of CN101182601, published on May 21, 2008.
English Abstract of CN1043752C, published on Jun. 23, 1999.
English Abstract of CN87101034, published on Aug. 28, 1991.
English Abstract of RU2079431, published on May 20, 1997.

(56) References Cited

OTHER PUBLICATIONS

English Abstract of RU2063458, published on Jul. 10, 1996.
English Abstract of RU 2 048 565, published on Nov. 20, 1995.
English Abstract of RU 2 040 587, published on Jul. 25, 1995.
English Abstract of RU 2 034 074, published on Apr. 30, 1995.
English Abstract of RU 2 031 168, published on Mar. 20, 1995.
English Abstract of RU 2 020 175, published on Sep. 30, 1994.
English Abstract of RU 2 010 876, published on Apr. 15, 1994.
English Abstract of RU 2 094 374, published on Oct. 27, 1997.
English Abstract of RU 2 081 831, published on Jun. 20, 1997.
English Abstract of RU 2 070 596, published on Dec. 20, 1996.
English Abstract of AU2008286599A1, "A process of smelting monazite rare earth ore rich in Fe", published on Feb. 19, 2009.
English Abstract of KR820001546, "Production of Titanium Metal Valves", published on Aug. 31, 1982.
English Abstract of KR100927466, published on Nov. 19, 2009.
English Abstract of RU 2 069 180, published on Nov. 20, 1996.
English Abstract of RU 2 068 392, published on Oct. 27, 1996.
English Abstract of RU 2 062 810, published on Jun. 27, 1996.
English Abstract of RU 2 055 828, published on Mar. 10, 1996.
English Abstract of RU 2 049 728, published on Dec. 10, 1995.
English Abstract of RU 1 704 483, published on Oct. 27, 1996.
English Abstract of SU1567518, published on May 30, 1990.
English Abstract of SU1424174, published on Jul. 23, 1991.
English Abstract of RU2038309, published on Jun. 27, 1995.
English Abstract of HU51574, published on May 28, 1990.
English Abstract of JP2008253142, published on Oct. 23, 2008.
English Abstract of JP2005152756, published on Jun. 16, 2005.
English Abstract of JP2005082462, published on Mar. 31, 2005.
English Abstract of JP2005219938, published on Aug. 18, 2005.
English Abstract of JP2004036003, published on Feb. 5, 2004.
English Abstract of WO2011092292, published on Aug. 4, 2011.
English Abstract of CN101157453, published on Apr. 9, 2008.
English Abstract of AU2737892, published on Mar. 13, 1993.
English Abstract of JPH09249420, published on Sep. 22, 1997.
English Abstract of CN102515590, published on Jun. 27, 2012.
English Abstract of CN102502745, published on Jun. 20, 2012.
English Abstract of WO2007082447, published on Jul. 26, 2007.
English Abstract of CN102694218, published on Sep. 26, 2012.
English Abstract of RU2183225, published on Jun. 10, 2002.
English Abstract of JP2009249674, published on Oct. 29, 2009.
English Abstract of CN102719674, published on Oct. 10, 2012.
English Abstract of 102680423, published on Sep. 19, 2012.
English Abstract of JP2005112636, published on Apr. 28, 2005.
English Abstract of CN101285127, published on Oct. 15, 2008.
Australie Minerals & Mining Group LTD, "AMMG Updates Process Design for HPA Chemical Project", Oct. 3, 2014, pp. 1-4.
Adham et al., "Fluid Bed Dehydration of Magnesium Chloride", Magnesium Technology 2012, TMS (The Minerals, Metals & Materials Society), 2012, pp. 49-53.
Dutrizac et al., "Fundamentals of Serpentine Leaching in Hydrochloric Acid Media", Magnesium Technology 2000, The Minerals, Metals & Materials Society, 2000, pp. 41-51.
English Abstract of CN1044126(C), "Stretched polypropylene film", published on Jul. 14, 1999.
Kumar et al., "Refining of a low-grade molybdenite concentrate", Hydrometallurgy 86 (2007) 56-62.
Wang et al., "Metallurgical processes for scandium recovery from various resources: A review", Hydrometallurgy 108 (2011) 100-108.
Fang et al., "Recovery of gallium from coal fly ash", Hydrometallurgy 41 (1996) 187-200.
Gutiérrez et al., "Recovery of gallium from coal fly ash by a dual reactive extraction process", Waste Management & Research (1997) 16, 371-382.
English Abstact of RU2237111 (C1), "Method of Recovering Magnesium From Silicon-Containing Wastes", published on Sep. 27, 2004.
Hudson et al., "Direct Calcination of AlCl3 •6H2O with Off-Gas use for Crystallization", United States Department of the Interior Bureau of Mines, Contract No. J0188096, 1979, pp. 1-28.
Elsner et al., "Alumina via hydrochloric acid leaching of high silica bauxites—Process Development", 1984, pp. 411-429.
Maysilles et al., "Aluminum Chloride Hexahydrate Crystallization by HCl Gas Sparging", U.S. Dept. of the Interior, Bureau of Mines, 1982, pp. 1-38.
English Translation of CN102452677, published on May 16, 2012.
Brand et al., "Formation of α-Al2O3 by thermal decomposition of basic aluminum chlorides at low temperatures", Crystal Research and Technology 1989 (24) 671-675.
Park et al., "Manufacture of low-soda alumina from clay", Industrial and Engineering Chemistry 1996 (35) 4379-4385.
Yanagida et al., "The role of water vapor in formation of alpha alumina from transient alumina" Journal of Ceramic Association Japan 1966 (74) 371-77.
Pijolat et al., "Influence of additives and water vapor on the transformation of transition aluminas into alpha alumina", Thermochimica Acta 1987 (122) 71-77.
Bagwell et al., "Effect of seeding and water vapor on the nucleation and growth of α-Al2O3 from γ-Al2O3", Journal of the American Ceramic Society 1999 (82) 825-832.
Hrabe et al., "The influence of water vapor on thermal transformations of boehmite", Journal of Material Research 1992 (7) 444-449.
English Abstract of Petzold et al., "Thermoanalytical studies on the decomposition of aluminum chloride hexahydrate", Journal of thermal analysis 1981 (20) 71-86.
Hoffman et al., "Development of a hydrochloric acid process for the production of alumina from clay", Journal of research of the national bureau of standards 1946 (37) 409-428.
Marchessaux et al., "Thermal decomposition of aluminum hexahydrate chloride (AlCl3 x 6H2 O) for alumina production", Light metals 1979 (1) 189-204.
Miller et al., "Fluidized-bed decomposition of aluminum chloride hexahydrate", Light Metals: Proceedings of Sessions, AIME Annual Meeting (Warrendale, Pennsylvania), 1983 253-271.
English Abstract of CN101781719, "Method for recovering rare earth from oil shale waste slag", published on Jul. 21, 2010.
Shanks et al., "Options in the HCl process for the production of alumina from clay", Light Metals 1986, R.E. Miller, Editor, p. 1089.
Bengston et al., "Alumina process feasibility study and preliminary pilot plant design. Task 3 report: preliminary design of 25 ton per day pilot plant.", vol. 1, Process Technology and Costs. Bureau of Mines Open File Report PB81-125031, 1979.
Liu et al., "High Purity Alumina Powders Extracted from Aluminum Dross by the Calcining-Leaching Process", TMS (The Minerals, Metals & Materials Society), 2011, pp. 197-200.
English Abstract of RU2158787, "Process of Winning of Magnesium", published on Nov. 10, 2000.
Becze et al., "Precipitation of Hematite and Recovery of Hydrochloric Acid from Concentrated Chloride Solutions by a Novel Hydrolytic Decomposition Process", TMS (The Minerals & Materials Society, Jan. 2001.
English Translation—Chi et al., Derwent Acc-No. 2010-L68306 for the patent family including CN 101811712 A, published on Apr. 27, 2010.
English Translation of CN102849765(A), "Method for preparing alumina from low-grade bauxite by acid leaching", published on Jan. 2, 2013.
English Translation of CN102849767(A), "Method for preparing alumina by using power plant fly ash", published on Jan. 2, 2013.
English Translation of CN103420405(A), "Method for extracting aluminum oxides from aluminum-containing waste residues", published on Dec. 4, 2013.
Demopoulos et al., "New Technologies for HCl Regeneration in Chloride Hydrometallurgy", World of Metallurgy—Erzmetall 61 (Jan. 2008) No. 2.
English Abstract of CN1099424(A), "Method for treating blast furnace slag with diluted chlorhydric acid", published on Mar. 1, 1995.

(56) References Cited

OTHER PUBLICATIONS

English Abstract of CN103964480(A), "Processes for producing aluminum oxide by using hydrochloric acid method", published on Aug. 6, 2014.
English Abstract of CN203922759(U), "Devide for preparing aluminum oxide by roasting aluminum chloride heahydrate crystal through rotary kiln", published on Nov. 5, 2014.
English Abstract of EP0850881(A1), Processe and apparatus for the preparation of iron oxides solutions containing hydrochloric acid iron oxide chloride, published on Jul. 1, 1998.
English Abstract of JPH0543252A, "Method for Removing Halogen Radical in Ferric Oxide", published on Feb. 23, 1993.
English Abstract of JPH0656429(A), "Production of Plate-Like Oxide Particulate Powder", published on Mar. 1, 1994.
English Abstract of JPH04354836(A), "Method for Leaching Silicomagnesionickel Ore", Published on Dec. 9, 1992.
English Abstract of RU2158787(C2), "Process of winning of magnesium", published on Nov. 10, 2000.
English Abstract of RU2237111(C1), "Method of Recovering Magnesium from Silicon-Containing Wastes", published on Sep. 27, 2004.
English Abstract of WO2008070885(A2), "Method for Increasing the Specific Surface of Iron Oxides in Spray Roasting Plants", published on Jun. 19, 2008.
Perander et al., "The Nature and Impacts of Fines in Smelter-Grade Alumina", Journal of Minerals, Metals & Materials Society 61.11 (2009): 33-39. Springer Link. Web. Aug. 12, 2015. <http://link.springer.com/article/10.1007/02Fs11837-009-0164-x>.
Weissenbaeck et al., "Development of Chloride Based Metal Extraction Techniques", Paper presented at ALTA May 28, 2013, Perth, WA.
English Abstract of RU2375306(C1), "Method of Producing Hydrate of Metal Oxide", published on Dec. 10, 2009.
English Abstract of CN101509072(A), "Method for extracting valuable metals from laterite nickel mine with hydrochloric acid full-closed circulation method", published on Aug. 19, 2009.
English Abstract of CN101121536(A), "Combination preparation method for anhydrous magnesium chloride and potassium sulphate", published on Feb. 13, 2008.
Shanks et al., "Options in the HCl Process for the Production of Alumina from Clay", Essential Readings in Light Metals: Alumina and Bauxite, vol. 1 (1986), pp. 1089-1097.

\* cited by examiner

METHODS FOR PURIFYING ALUMINIUM IONS

CROSS-REFERENCE TO RELATED APPLICATIONS

The present application is a 35 USC 371 national stage entry of PCT/CA2013/000963 filed on Nov. 14, 2013 and which claims priority on U.S. 61/726,079 filed on Nov. 14, 2012, which is hereby incorporated by reference in its entirety.

TECHNICAL FIELD

The present disclosure relates to improvements in the field of chemistry applied to the purification of aluminum ions and/or manufacture of aluminum-based products.

BACKGROUND OF THE DISCLOSURE

It can be the that most of the commercial alumina is produced by the Bayer Process. It is also possible to produce hydrated alumina by other methods. Several other methods result in the inclusion of high levels of one or more impurities.

Low purity specialty alumina can be used as a refractory material (resistant to very high temperatures), as a ceramic and in the electrolytic production of aluminum metal.

However, for certain applications, high purity alumina (HPA) is required. Many synthetic precious stones have a high purity alumina base, including ruby, topaz and sapphire. These crystals are used mostly in jewelry, infrared, UV and laser optics, and as a high-end electronic substrate.

Half of the world's annual production of ultra-pure alumina goes into making synthetic sapphire for use in fiber optics and, more recently, in LED lighting for home and automotive markets. It is also used in the production of high-pressure sodium vapor lamp tubes and the manufacturing of video and computer equipment, as well as in metallographic polishing and the polishing of optic and electronic materials.

There is a growth in HPA annual worldwide demand, which according to certain market experts should rise from 9,000 tons in 2012 to over 15,000 tons in 2015. This should lead to a substantial supply deficit of about 6,000 tons per year caused notably by the global increase of light emitting diodes (LED) demand.

A number of methods for preparing high purity alumina have been proposed that start with pure aluminum metal, organoaluminum compounds or alums. These in general start with a high cost material or generate products not recyclable to the process when calcined and are therefore not applicable to commercial production.

There is thus a need for providing an alternative to the existing solutions for purifying aluminum ions and/or for preparing alumina that has a high purity.

SUMMARY OF THE DISCLOSURE

According to one aspect, there is provided a process for purifying aluminum ions comprising:
  precipitating the aluminum ions under the form of $Al(OH)_3$ at a given pH value; and
  converting the $Al(OH)_3$ into $AlCl_3$ by reacting $Al(OH)_3$ with HCl and precipitating the $AlCl_3$; and
  heating the $AlCl_3$ under conditions effective for converting $AlCl_3$ into $Al_2O_3$.

According to another aspect, there is provided a process for purifying aluminum ions comprising:
  precipitating the aluminum ions under the form of $Al(OH)_3$ at a pH of about 7 to about 10; and
  converting the $Al(OH)_3$ into $AlCl_3$ by reacting $Al(OH)_3$ with HCl and precipitating the $AlCl_3$; and
  heating the $AlCl_3$ under conditions effective for converting $AlCl_3$ into $Al_2O_3$.

According to another aspect, there is provided a process for purifying aluminum ions comprising:
  precipitating the aluminum ions under the form of $Al(OH)_3$ at a pH of about 7 to about 10; and
  converting the $Al(OH)_3$ into $AlCl_3$ by reacting $Al(OH)_3$ with HCl and precipitating the $AlCl_3$; and
  heating the $AlCl_3$ under conditions effective for converting $AlCl_3$ into $Al_2O_3$ and optionally recovering gaseous HCl so-produced.

According to another aspect, there is provided a process for preparing aluminum comprising:
  precipitating the aluminum ions under the form of $Al(OH)_3$ at a pH of about 7 to about 10;
  converting the $Al(OH)_3$ into $AlCl_3$ by reacting $Al(OH)_3$ with HCl and precipitating the $AlCl_3$;
  heating the $AlCl_3$ under conditions effective for converting $AlCl_3$ into $Al_2O_3$; and
  converting the $Al_2O_3$ into aluminum.

According to another aspect, there is provided a process for preparing aluminum comprising:
  precipitating the aluminum ions under the form of $Al(OH)_3$ at a pH of about 7 to about 10;
  converting the $Al(OH)_3$ into $AlCl_3$ by reacting $Al(OH)_3$ with HCl and precipitating the $AlCl_3$;
  heating the $AlCl_3$ under conditions effective for converting $AlCl_3$ into $Al_2O_3$ and optionally recovering gaseous HCl so-produced; and
  converting the $Al_2O_3$ into aluminum.

According to another aspect, there is provided a process for purifying aluminum ions comprising:
  precipitating the aluminum ions under the form of $Al(OH)_3$ at a given pH value; and
  converting the $Al(OH)_3$ into $AlCl_3$ by reacting $Al(OH)_3$ with HCl and precipitating the $AlCl_3$; and
  heating the $AlCl_3$ under conditions effective for converting $AlCl_3$ into $Al_2O_3$ and optionally recovering gaseous HCl so-produced.

According to another aspect, there is provided a process for preparing aluminum comprising:
  precipitating the aluminum ions under the form of $Al(OH)_3$ at a given pH value;
  converting the $Al(OH)_3$ into $AlCl_3$ by reacting $Al(OH)_3$ with HCl and precipitating the $AlCl_3$;
  heating the $AlCl_3$ under conditions effective for converting $AlCl_3$ into $Al_2O_3$; and
  converting the $Al_2O_3$ into aluminum.

According to another aspect, there is provided a process for preparing aluminum comprising:
  precipitating the aluminum ions under the form of $Al(OH)_3$ at a given pH value;
  converting the $Al(OH)_3$ into $AlCl_3$ by reacting $Al(OH)_3$ with HCl and precipitating the $AlCl_3$;
  heating the $AlCl_3$ under conditions effective for converting $AlCl_3$ into $Al_2O_3$ and optionally recovering gaseous HCl so-produced; and
  converting the $Al_2O_3$ into aluminum.

According to another aspect, there is provided a process for preparing aluminum comprising converting $Al_2O_3$ obtained by a process as defined in the present disclosure into aluminum.

BRIEF DESCRIPTION OF DRAWINGS

In the following drawings, which represent by way of example only, various embodiments of the disclosure.

DETAILED DESCRIPTION OF VARIOUS EMBODIMENTS

Figure 1A:
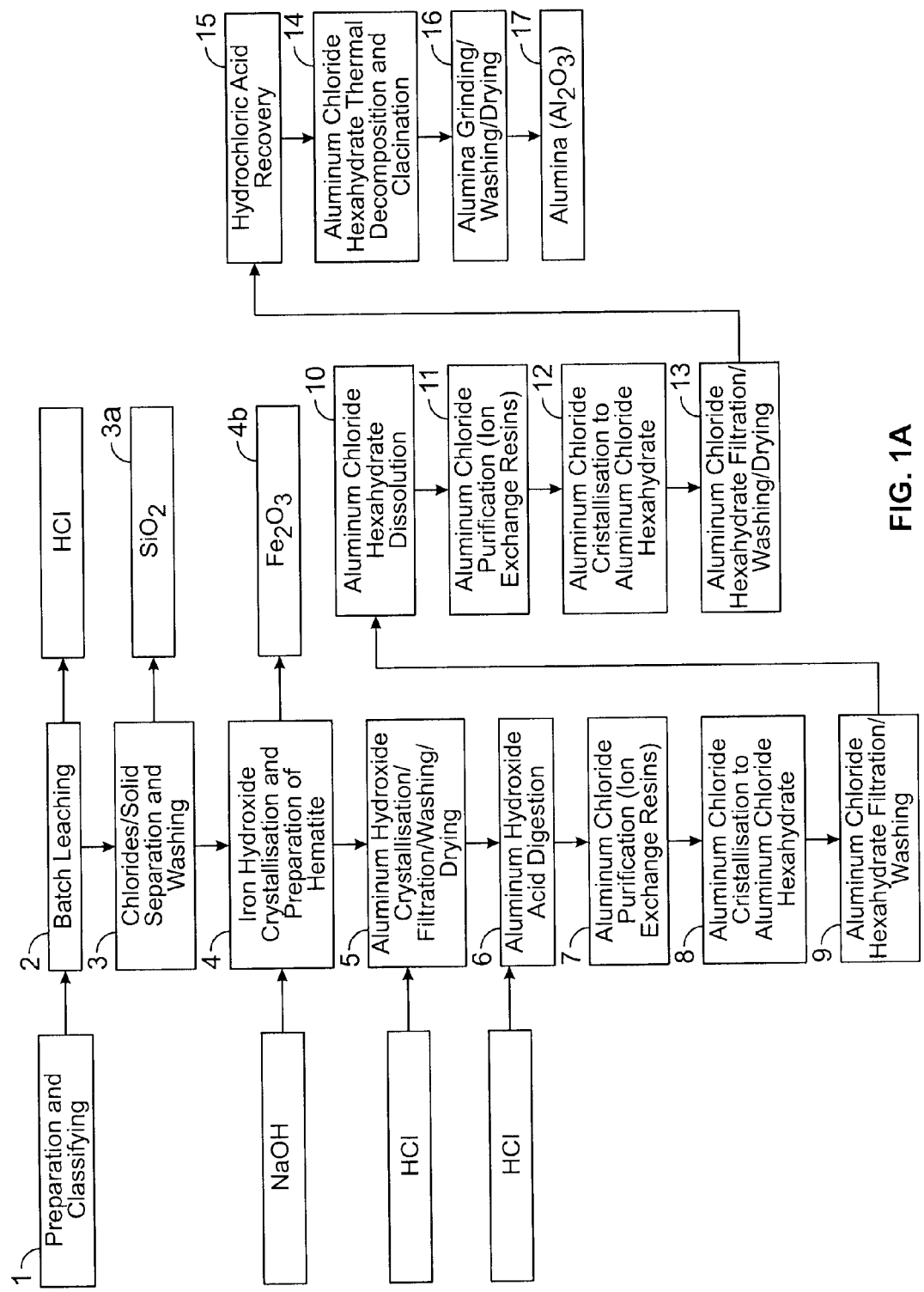
FIGS. 1A, 1B and 1C show a bloc diagram of an example of process according to the present disclosure.

Further features and advantages will become more readily apparent from the following description of various embodiments as illustrated by way of examples only and in a non-limitative manner.

The expression "red mud" as used herein refers to an industrial waste product generated during the production of alumina. For example, such a waste product can contain silica, aluminum, iron, calcium, titanium. It can also contains an array of minor constituents such as Na, K, Cr, V, Ni, Ba, Cu, Mn, Pb, Zn etc. For example, red mud can comprises about 15 to about 80% by weight of $Fe_2O_3$, about 1 to about 35% by weight $Al_2O_3$, about 1 to about 65% by weight of $SiO_2$, about 1 to about 20% by weight of $Na_2O$, about 1 to about 20% by weight of CaO, and up to about 35% by weight of $TiO_2$. According to another example, red mud can comprise about 30 to about 65% by weight of $Fe_2O_3$, about 10 to about 20% by weight $Al_2O_3$, about 3 to about 50% by weight of $SiO_2$, about 2 to about 10% by weight of $Na_2O$, about 2 to about 8% by weight of CaO, and from 0 to about 25% by weight of $TiO_2$.

The expression "fly ashes" as used herein refers to an industrial waste product generated in combustion. For example, such a waste product can contain various elements such as silica, oxygen, aluminum, iron, calcium. For example, fly ashes can comprise silicon dioxide ($SiO_2$) and aluminium oxide ($Al_2O_3$). For example, fly ashes can further comprises calcium oxide (CaO) and/or iron oxide ($Fe_2O_3$). For example fly ashes can comprise fine particles that rise with flue gases. For example, fly ashes can be produced during combustion of coal. For example, fly ashes can also comprise at least one element chosen from arsenic, beryllium, boron, cadmium, chromium, chromium VI, cobalt, lead, manganese, mercury, molybdenum, selenium, strontium, thallium, and/or vanadium. For example, fly ashes can also comprise rare earth elements. For example, fly ashes can be considered as an aluminum-containing material.

The expression "slag" as used herein refers to an industrial waste product comprising aluminum oxide and optionally other oxides such as oxides of calcium, magnesium, iron, and/or silicon.

The term "hematite" as used herein refers, for example, to a compound comprising $\alpha$-$Fe_2O_3$, $\gamma$-$Fe_2O_3$, $\beta$-FeO.OH or mixtures thereof.

Terms of degree such as "about" and "approximately" as used herein mean a reasonable amount of deviation of the modified term such that the end result is not significantly changed. These terms of degree should be construed as including a deviation of at least ±5% or at least ±10% of the modified term if this deviation would not negate the meaning of the word it modifies.

For example, precipitating the aluminum ions under the form of $Al(OH)_3$ can be carried out at a pH of about 9 to about 10, about 9.2 to about 9.8, about 9.3 to about 9.7 or about 9.5.

For example, precipitating the aluminum ions can be carried out by reacting the aluminum ions with an acid or with a base.

For example, the acid can be $H_2SO_4$, HCl, $HNO_3$ etc.

For example, the base can be NaOH, KOH etc.

For example, precipitating the aluminum ions can be carried out by reacting the aluminum ions with $AlCl_3$.

For example, precipitating the aluminum ions can be carried out by reacting a basic composition comprising the aluminum ions with an acid.

For example, precipitating the aluminum ions can be carried out by reacting a basic composition comprising the aluminum ions with HCl and/or $AlCl_3$.

For example, precipitating the aluminum ions can be carried out by reacting an acidic composition comprising the aluminum ions with a base.

For example, precipitating the aluminum ions can be carried out by reacting an acidic composition comprising the aluminum ions with a NaOH and/or KOH.

For example, precipitation of the aluminum ions can be carried out at a temperature of about 50 to about 75° C., about 55 to about 70° C., or about 60 to about 65° C.

For example, a first precipitation of the aluminum ions can be carried out at the pH of about 7 to about 10 by reacting the aluminum ions with HCl and/or $AlCl_3$ and wherein a second precipitation is carried out by reacting the aluminum ions with HCl and/or $AlCl_3$ in a reaction media maintained at a value of about 7 to about 9, about 7.5 to about 8.5, about 7.8 to about 8.2 or about 8.

For example, a first precipitation of the aluminum ions can be carried out at the pH of about 7 to about 10 by reacting a basic composition comprising the aluminum ions with HCl and wherein a second precipitation is carried out by reacting the aluminum ions with $AlCl_3$ in a reaction media maintained at a value of about 7 to about 9, about 7.5 to about 8.5, about 7.8 to about 8.2 or about 8.

For example, a first precipitation of said aluminum ions under the form of $Al(OH)_3$ can be carried out at said pH of about 7 to about 10 by reacting the aluminum ions with HCl and/or $AlCl_3$ and wherein a second precipitation of the aluminum ions under the form of $Al(OH)_3$ is carried out by reacting said aluminum ions with HCl and/or $AlCl_3$ in a reaction media maintained at a value of about 7 to about 9.

For example, the aluminum ions can be precipitated under the form of $Al(OH)_3$ at a given pH value that can be for example of about 7 to about 10.

For example, the second precipitation can be carried out at a temperature of about 50 to about 75° C., about 55 to about 70° C., or about 60 to about 65° C.

For example, reacting with HCl can comprise digesting in HCl.

For example, reacting with HCl can comprise sparging with HCl.

For example, converting the $Al(OH)_3$ into the $AlCl_3$ can be carried out by reacting the $Al(OH)_3$ with the HCl, the HCl having a concentration of 5 to about 14 moles per liter, 6 to about 13 moles per liter, about 7 to about 12 moles per liter, about 8 to about 11 moles per liter, about 9 to about 10 moles per liter, about 9.2 to about 9.8 moles per liter, about 9.3 to about 9.7 moles per liter, or about 9.5 moles per liter.

For example, converting the Al(OH)$_3$ into the AlCl$_3$ can be carried out by reacting the Al(OH)$_3$ with the HCl at a temperature of about 80 to about 120° C., about 90 to about 110° C., about 95 to about 105° C., or about 97 to about 103° C.

For example, the obtained AlCl$_3$ can be purified by means of an ion exchange resin. For example, ion exchange resins can be an anionic exchange resin.

For example, AlCl$_3$ can be precipitated under the form of AlCl$_3$.6H$_2$O at a temperature of about 100 to about 120° C., about 105 to about 115° C., about 108 to about 112° C., or about 109 to about 111° C.

For example, AlCl$_3$ can be precipitated under the form of AlCl$_3$.6H$_2$O, under vacuum, at a temperature of about 70 to about 90° C., about 75 to about 85° C., or about 77 to about 83° C.

For example, the precipitated AlCl$_3$ can then be solubilized in purified water and then recrystallized.

For example, AlCl$_3$ can be solubilized in purified water, the solubilization being carried out at a pH of about 3 to about 4, or about 3.2 to about 3.8.

For example, precipitating AlCl$_3$ is carried out by crystallizing the AlCl$_3$ under the form of AlCl$_3$.6H$_2$O.

For example, converting AlCl$_3$ into Al$_2$O$_3$ can be carried out under an inert atmosphere.

For example, converting AlCl$_3$ into Al$_2$O$_3$ can be carried out under an atmosphere of nitrogen, argon or a mixture thereof.

For example, converting AlCl$_3$ into Al$_2$O$_3$ can be carried out under an atmosphere of steam (water vapor).

For example, HCl can be recovered.

For example, the recovered HCl can be purified and/or concentrated.

For example, the recovered HCl can be gaseous HCl and can be treated with H$_2$SO$_4$ so as to reduce the amount of water present in the gaseous HCl.

For example, the recovered HCl can be gaseous HCl and can be passed through a packed column so as to be in contact with a H$_2$SO$_4$ countercurrent flow so as to reduce the amount of water present in the gaseous HCl.

For example, the column can be packed with polypropylene or polytrimethylene terephthalate.

For example, the concentration of gaseous HCl can be increased by at least 50, 60, or 70%.

For example, the concentration of gaseous HCl can be increased up to at least 50, 60, or 70%.

For example, the recovered HCl can be gaseous HCl and can be treated with CaCl$_2$ so as to reduce the amount of water present in the gaseous HCl.

For example, the recovered HCl can be gaseous HCl and can be passed through a column packed with CaCl$_2$ so as to reduce the amount of water present in the gaseous HCl.

For example, the concentration of gaseous HCl can be increased from a value below the azeotropic point before treatment to a value above the azeotropic point after treatment.

For example, gaseous HCl can be concentrated and/or purified by means of H$_2$SO$_4$. For example, gaseous HCl can be passed through a packed column where it is contacted with a H$_2$SO$_4$ countercurrent flow. For example, by doing so, concentration of HCl can be increased by at least 50 wt %, at least 60 wt %, at least 70 wt %, at least 75 wt %, at least 80 wt %, about 50 wt % to about 80 wt %, about 55 wt % to about 75 wt %, or about 60 wt %. For example, the column can be packed with a polymer such as polypropylene or polytrimethylene terephthalate (PTT).

For example, gaseous HCl can be concentrated and/or purified by means of CaCl$_2$. For example, gaseous HCl can be passed through a column packed with CaCl$_2$.

For example, the processes can further comprise converting alumina (Al$_2$O$_3$) into aluminum. Conversion of alumina into aluminum can be carried out, for example, by using the Hall-Héroult process. References is made to such a well known process in various patents and patent applications such as US 20100065435; US 20020056650; U.S. Pat. No. 5,876,584; U.S. Pat. No. 6,565,733. Conversion can also be carried out by means of other processes such as those described in U.S. Pat. No. 7,867,373; U.S. Pat. No. 4,265,716; U.S. Pat. No. 6,565,733 (converting alumina into aluminum sulfide followed by the conversion of aluminum sulfide into aluminum.)

For example, gaseous HCl can be concentrated and/or purified by means of LiCl. For example, gaseous HCl can be passed through a column packed with LiCl.

For example, HCl can be distilled through a rectification column in which heat is provided from aluminium chloride decomposition. For example, HCl generated from conversion of AlCl$_3$ into Al$_2$O$_3$ can then be optionally purified by means of a distillation (for example in a rectification column). Such HCl being already hot since being generated from conversion of AlCl$_3$ into Al$_2$O$_3$. The same can also be done when converting other metal chlorides, rare earth chlorides or rare metal chlorides into their corresponding oxides. Decomposition and/or calcination reactors, and from any spray roasting device (for example, magnesium chloride, mixed oxides chlorides) can be fed to reboiler of the column.

For example, converting Al$_2$O$_3$ into aluminum can be carried out by means of the Hall-Héroult process.

For example, converting Al$_2$O$_3$ into aluminum can be carried out by converting Al$_2$O$_3$ into Al$_2$S$_3$ and then converting Al$_2$S$_3$ into aluminum.

For example, the aluminum ions can be obtained from various manner. For example, the aluminum ions can be obtained by leaching an aluminum-containing material.

For example, the aluminum-containing material can be an aluminum-containing ore. The aluminum-containing ore can be chosen from aluminosillicate minerals, clays, argillite, nepheline, mudstone, beryl, cryolite, garnet, spinel, kaolin, bauxite and mixtures thereof. The aluminum-containing material can also be a recycled industrial aluminum-containing material such as slag. The aluminum-containing material can also be red mud or fly ashes.

For example, the aluminum ions can be obtained by leaching the aluminum-containing material.

For example, the aluminum-containing material can be alumina, aluminum hydroxide, aluminum chloride or aluminum metal (or aluminum in its metallic form).

For example, the aluminum ions can be obtained by:
  leaching the aluminum-containing material with an acid so as to obtain a leachate and a solid residue; and
  separating the leachate from the solid residue.

For example, the aluminum ions can be obtained by:
  leaching the aluminum-containing material with an acid so as to obtain a leachate and a solid residue;
  separating the leachate from the solid residue; and
  reacting the leachate with a base.

For example, the aluminum ions can be obtained by:
  leaching the aluminum-containing material comprising iron ions (for example Fe$^{2+}$ and/or Fe$^{3+}$) with an acid so as to obtain a leachate and a solid residue;

optionally removing at least a portion of the iron ions from the leachate; and separating the leachate from the solid residue.

For example, the aluminum ions can be obtained by:

leaching the aluminum-containing material comprising iron ions (for example $Fe^{2+}$ and/or $Fe^{3+}$) with an acid so as to obtain a leachate and a solid residue;

optionally removing at least a portion of the iron ions from the leachate;

separating the leachate from the solid residue; and reacting the leachate with a base.

For example, precipitation of iron ions can be carried out at a pH comprised between 10.5 and 14.0; 10.5 and 13.0; 10.5 and 12.0; 10.5 and 11.5; or 10.5 and 11.

For example, precipitation of iron ions can be carried out at a pH of at least about 10.0, at least about 10.5, at least about 11.0, at least about 11.5, at least about 12.0, about 10.5 to about 14.5, about 10.5 to about 11.0, about 11.0 to about 14.0, about 11.0 to about 13.0, or about 11.0 to about 12.0.

For example, precipitation of iron ions be carried out at a pH of about 10.8 to about 11.8, about 11 to about 12, about 11.5 to about 12.5, about 11.0 to about 11.6, about 11.2 to about 11.5, about 10.5 to about 12, about 11.5 to about 12.5, or about 11.8 to about 12.2, about 11.0, about 11.1, about 11.2, about 11.3, about 11.4, about 11.5, about 11.6, about 11.7, about 11.8, about 11.9, or about 12.0.

For example, the aluminum ions can be obtained by:

leaching the aluminum-containing material with an acid so as to obtain a composition comprising the aluminum ions and other metal ions; and at least partially removing the other metal ions from the composition by substantially selectively precipitating at least a portion the other metal ions.

For example, the aluminum ions can be obtained by:

leaching the aluminum-containing material with an acid so as to obtain a composition comprising the aluminum ions and other metal ions; and at least substantially selectively removing the other metal ions or the aluminum ions from the composition.

For example, removal of the other metal ions or the aluminum ions can be carried out by, for example, by means of a precipitation, extraction and/or isolation by means of a liquid-liquid extraction optionally with the use of an extracting agent.

For example, the aluminum ions can be obtained by:

leaching the aluminum-containing material with an acid so as to obtain a composition comprising the aluminum ions and other metal ions; and at least substantially selectively removing the other metal ions or the aluminum ions from the composition by substantially selectively precipitating the other metal ions or the aluminum ions from the composition.

For example, the aluminum ions can be obtained by:

leaching the aluminum-containing material with an acid so as to obtain a composition comprising the aluminum ions and other metal ions; and at least substantially selectively removing the other metal ions or the aluminum ions from the composition by substantially selectively precipitating the other metal ions or the aluminum ions from the composition.

The other metal ions can be ions from at least one metal chosen from Ti, Zn, Cu, Cr, Mn, Fe, Ni, Pb, In, rare earth elements, and rare metals etc.

For example, the rare earth element can be chosen from scandium, yttrium, lanthanum, cerium, praseodymium, neodymium, promethium, samarium, europium, gadolinium, terbium, dysprosium, holmium, erbium, thulium, ytterbium, and lutetium. For example, the at least one rare metal can be chosen from indium, zirconium, lithium, and gallium. These rare earth elements and rare metals can be in various form such as the elemental form (or metallic form), or under the form of chlorides, oxides, hydroxides etc.

For example, the aluminum ions can be obtained by:

leaching the aluminum-containing material with an acid so as to obtain a leachate comprising aluminum ions and a solid, and separating the solid from the leachate; and reacting the leachate with HCl so as to obtain a liquid and a precipitate comprising the aluminum ions in the form of $AlCl_3$, and separating the precipitate from the liquid.

The acid used for leaching aluminum-containing material can be HCl, $H_2SO_4$, $HNO_3$ or mixtures thereof. More than one acid can be used as a mixture or separately. Solutions made with these acids can be used at various concentration. For example, concentrated solutions can be used. For example, 6 M or 12 M HCl can be used. For example, about 6 M to about 12 M HCl can be used. For example, up to 100% wt $H_2SO_4$ can be used.

The leaching can be carried out under pressure. For example, the pressure can be about 10 to about 300 psig, about 25 to about 250 psig, about 50 to about 200 psig or about 50 to about 150 psig. The leaching can be carried out for about 30 minutes to about 5 hours. It can be carried out at a temperature of about 60 to about 300° C., about 75 to about 275° C. or about 100 to about 250° C.

For example, the leaching can be carried out at a pH of about 0.5 to about 2.5, about 0.5 to about 1.5, or about 1; then, when iron is present, iron can be precipitated at a pH of at least about 9.5, 10, 10.5, 11, 11.5; then aluminum can be precipitated at a pH of about 7 to about 11, about 7.5 to about 10.5, or about 8 to about 9.

The leaching can be carried out under pressure into an autoclave. For example, it can be carried out at a pressure of 5 KPa to about 850 KPa, 50 KPa to about 800 KPa, 100 KPa to about 750 KPa, 150 KPa to about 700 KPa, 200 KPa to about 600 KPa, or 250 KPa to about 500 KPa. The leaching can be carried out at a temperature of at least 80° C., at least 90° C., or about 100° C. to about 110° C. In certain cases it can be done at higher temperatures so as to increase extraction yields in certain ores.

After the leaching, various bases can be used for raising up the pH such as KOH, NaOH, $Ca(OH)_2$, CaO, MgO, $Mg(OH)_2$, $CaCO_3$, $Na_2CO_3$, $NaHCO_3$, or mixtures thereof.

For example, iron ions, when present, can be precipitated. When precipitating iron ions, the iron ions can be precipitated by means of an ionic precipitation and they can precipitate in the form of various salts, hydroxides or hydrates thereof. For example, the iron ions can be precipitated as $Fe(OH)_3$, $Fe(OH)_2$, hematite, geotite, jarosite or hydrates thereof.

For example, aluminum ions can be precipitated. When precipitating aluminum ions, the aluminum ions can be precipitated by means of an ionic precipitation and they can precipitate in the form of various salts, (such as chlorides, sulfates) or hydroxides or hydrates thereof. For example, the aluminum ions can be precipitated as $Al(OH)_3$, $AlCl_3$, $Al_2(SO_4)_3$, or hydrates thereof.

For example, the processes can comprise precipitating the aluminum ions by adjusting the pH at a value of about 7 to about 10 or about 8 to about 10. The processes can further comprise adding a precipitating agent effective for facilitating precipitation of the aluminum ions. For example, the precipitating agent can be a polymer. For example, the precipitating agent can be an acrylamide polymer.

For example, iron ions can be precipitated under the form of $Fe^{3+}$, $Fe^{2+}$, and a mixture thereof.

For example, precipitated iron ions can be under the form of $Fe(OH)_2$, $Fe(OH)_3$, or a mixture thereof.

For example, the processes can comprise reacting dry individual salts (for example Na or K salts) obtained during the processes with $H_2SO_4$ and recovering HCl while producing marketable $K_2SO_4$ and $Na_2SO_4$ and recovering hydrochloric acid of about 15 to about 90% wt.

For example, sodium chloride produced in the processes can undergo a chemical reaction with sulfuric acid so as to obtain sodium sulfate and regenerate hydrochloric acid. Potassium chloride can undergo a chemical reaction with sulfuric acid so as to obtain potassium sulfate and regenerate hydrochloric acid. Sodium and potassium chloride brine solution can alternatively be the feed material to adapted small chlor-alkali electrolysis cells. In this latter case, common bases (NaOH and KOH) and bleach (NaOCl and KOCl) are produced.

For example, the processes can further comprise, after recovery of the rare earth elements and/or rare metals, recovering NaCl from the liquid, reacting the NaCl with $H_2SO_4$, and substantially selectively precipitating $Na_2SO_4$.

For example, the processes can further comprise, downstream of recovery of the rare earth elements and/or rare metals, recovering KCl from the liquid, reacting the KCl with $H_2SO_4$, and substantially selectively precipitating $K_2SO_4$.

For example, the processes can further comprise, downstream of recovery of the rare earth elements and/or rare metals, recovering NaCl from the liquid, carrying out an electrolysis to generate NaOH and NaOCl.

For example, the processes can further comprise, downstream of recovery of the rare earth elements and/or rare metals, recovering KCl from the liquid, reacting the KCl, carrying out an electrolysis to generate KOH and KOCl.

For example, the processes can further comprise reacting the NaCl with $H_2SO_4$ so as to substantially selectively precipitate $Na_2SO_4$.

For example, the processes can further comprise reacting the KCl with $H_2SO_4$ so as to substantially selectively precipitate $K_2SO_4$.

For example, the processes can further comprise carrying out an electrolysis of the NaCl to generate NaOH and NaOCl.

For example, the processes can further comprise carrying out an electrolysis of the KCl to generate KOH and KOCl.

For example, produced NaCl can undergo chemical reaction with $H_2SO_4$ to produce $Na_2SO_4$ and HCl at a concentration at or above azeotropic concentration. Moreover, KCl can undergo chemical reaction with $H_2SO_4$ to produce $K_2SO_4$ and HCl having a concentration that is above the azeotropic concentration. Sodium and potassium chloride brine solution can be the feed material to adapted small chlor-alkali electrolysis cells. In this latter case, common bases (NaOH and KOH) and bleach (NaOCl and KOCl) are produced as well as HCl.

Various options are available to convert NaCl and KCl with intent of recovering HCl. One example can be to contact them with highly concentrated sulfuric acid ($H_2SO_4$), which generates sodium sulphate ($Na_2SO_4$) and potassium sulfate ($K_2SO_4$), respectively, and regenerates HCl at a concentration above 90% wt. Another example, is the use of a sodium and potassium chloride brine solution as the feed material to adapted small chlor-alkali electrolysis cells. In this latter case, common bases (NaOH and KOH) and bleach (NaOCl and KOCl) are produced. The electrolysis of both NaCl and KCl brine is done in different cells where the current is adjusted to meet the required chemical reaction. In both cases, it is a two-step process in which the brine is submitted to high current and base (NaOH or KOH) is produced with chlorine ($Cl_2$) and hydrogen ($H_2$). $H_2$ and $Cl_2$ are then submitted to a common flame where highly concentrated acid in gas (100% wt.) phase is produced and can be used directly, for example, in a stage requiring dry highly concentrated acid.

NaCl recovered from the processes of the present disclosure can, for example, be reacted with $SO_2$, so as to produce HCl and $Na_2SO_4$. Such a reaction that is an exothermic reaction can generate steam that can be used to activate a turbine and eventually produce electricity.

For example, steam (or water vapor) can be injected and a plasma torch can be used for carrying fluidization.

For example, steam (or water vapor) can be injected and a plasma torch can be used for carrying fluidization.

For example, the steam (or water vapor) can be overheated.

For example, converting $AlCl_3$ into $Al_2O_3$ can comprise carrying out a calcination by means of carbon monoxide (CO).

For example, converting $AlCl_3$ into $Al_2O_3$ can comprise carrying out a calcination by means of a Refinery Fuel Gas (RFG).

For example, calcination can be carried out by injecting water vapor or steam and/or by using a combustion source chosen from fossil fuels, carbon monoxide, a Refinery Fuel Gas, coal, or chlorinated gases and/or solvants.

For example, calcination can be carried out by means of a rotary kiln.

For example, calcination can be carried out by injecting water vapor or steam and/or by using a combustion source chosen from natural gas or propane.

For example, calcination can be carried out by providing heat by means of electric heating, gas heating, microwave heating, For example, calcination can be carried out by using an electrical road.

For example, the fluid bed reactor can comprise a metal catalyst chosen from metal chlorides.

For example, the fluid bed reactor can comprise a metal catalyst that is $FeCl_3$, $FeCl_2$ or a mixture thereof.

For example, the fluid bed reactor can comprise a metal catalyst that is $FeCl_3$.

For example, the preheating system can comprise a plasma torch.

For example, steam can be used as the fluidization medium heating. Heating can also be electrical.

For example, a plasma torch can be used for preheating the calcination reactor.

For example, a plasma torch can be used for preheating air entering in the calcination reactor.

For example, a plasma torch can be used for preheating a fluid bed.

For example, the calcination medium can be substantially neutral in terms of $O_2$ (or oxidation). For example, the calcination medium can favorize reduction (for example a concentration of CO of about 100 ppm).

For example, the calcination medium is effective for preventing formation of $Cl_2$.

For example, the processes can comprise converting $AlCl_3.6H_2O$ into $Al_2O_3$ by carrying out a calcination of $AlCl_3.6H_2O$ that is provided by the combustion of gas mixture that comprises:

$CH_4$: 0 to about 1% vol;

$C_2H_6$: 0 to about 2% vol;
$C_3H_8$: 0 to about 2% vol;
$C_4H_{10}$: 0 to about 1% vol;
$N_2$: 0 to about 0.5% vol;
$H_2$: about 0.25 to about 15.1% vol;
CO: about 70 to about 82.5% vol; and
$CO_2$: about 1.0 to about 3.5% vol.

Such a mixture can be efficient for reduction in off gas volume of 15.3 to 16.3%; therefore the capacity increases of 15.3 to 16.3% proven on practical operation of the circulating fluid bed. Thus for a same flow it represents an Opex of 0.65*16.3%=10.6%.

For example, the air to natural gas ratio of ($Nm^3$/h over $Nm^3$/h) in the fluid bed can be about 9.5 to about 10

For example, the air to CO gas ratio of ($Nm^3$/h over $Nm^3$/h) in the fluid bed can be about 2 to about 3.

For example, the processes can comprise, before leaching the aluminum-containing material, a pre-leaching removal of fluorine optionally contained in the aluminum-containing material.

For example, the processes can comprise leaching of the aluminum-containing material with HCl so as to obtain the leachate comprising aluminum ions and the solid, separating the solid from the leachate; and further treating the solid so as to separate $SiO_2$ from $TiO_2$ that are contained therein.

For example, the processes can comprise leaching the aluminum-containing material with HCl so as to obtain the leachate comprising aluminum ions and the solid, separating the solid from the leachate; and further treating the solid with HCl so as to separate $SiO_2$ from $TiO_2$ that are contained therein.

The following examples are non-limitative.

Example 1

Figure 1B:
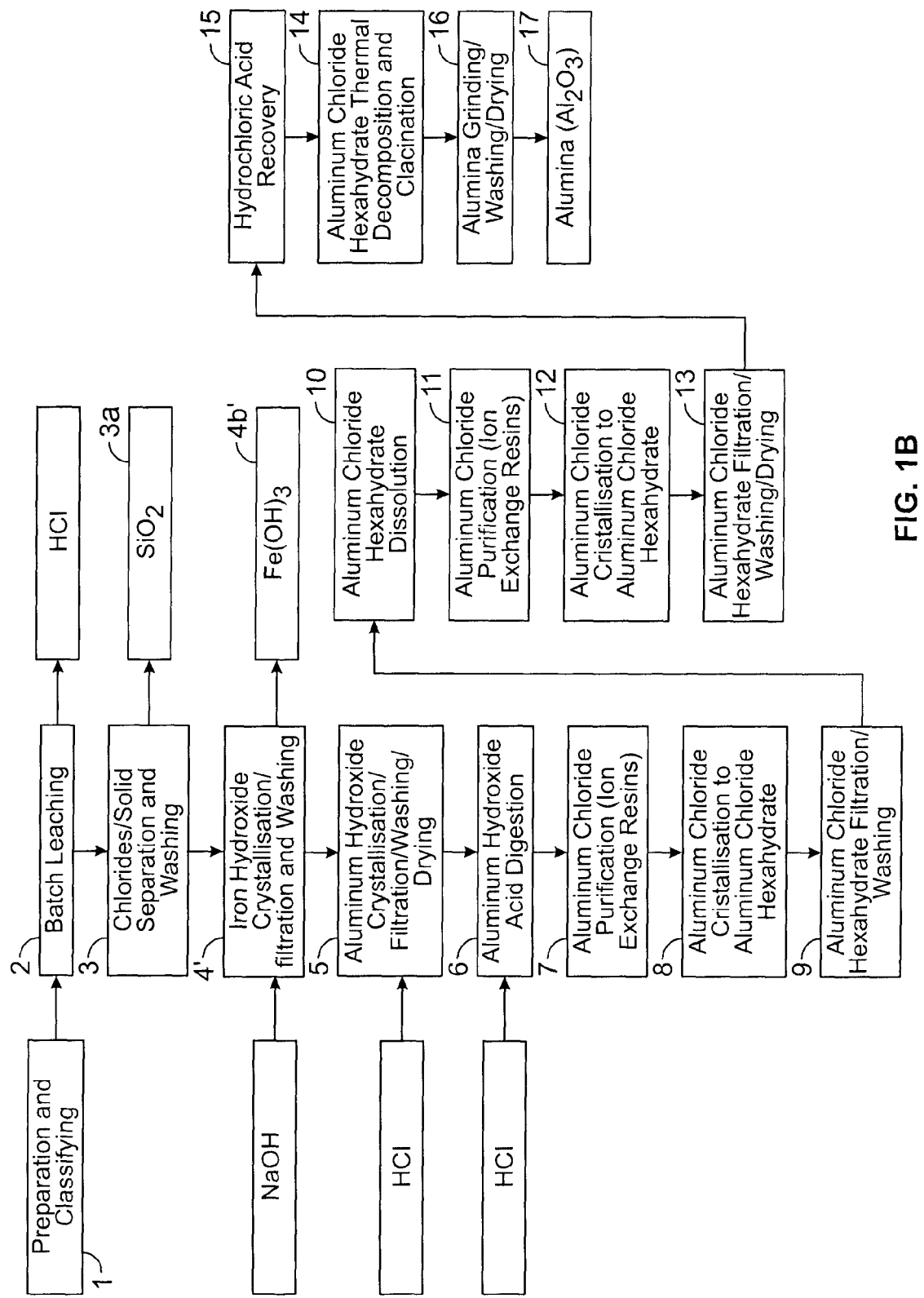
Figure 1C:
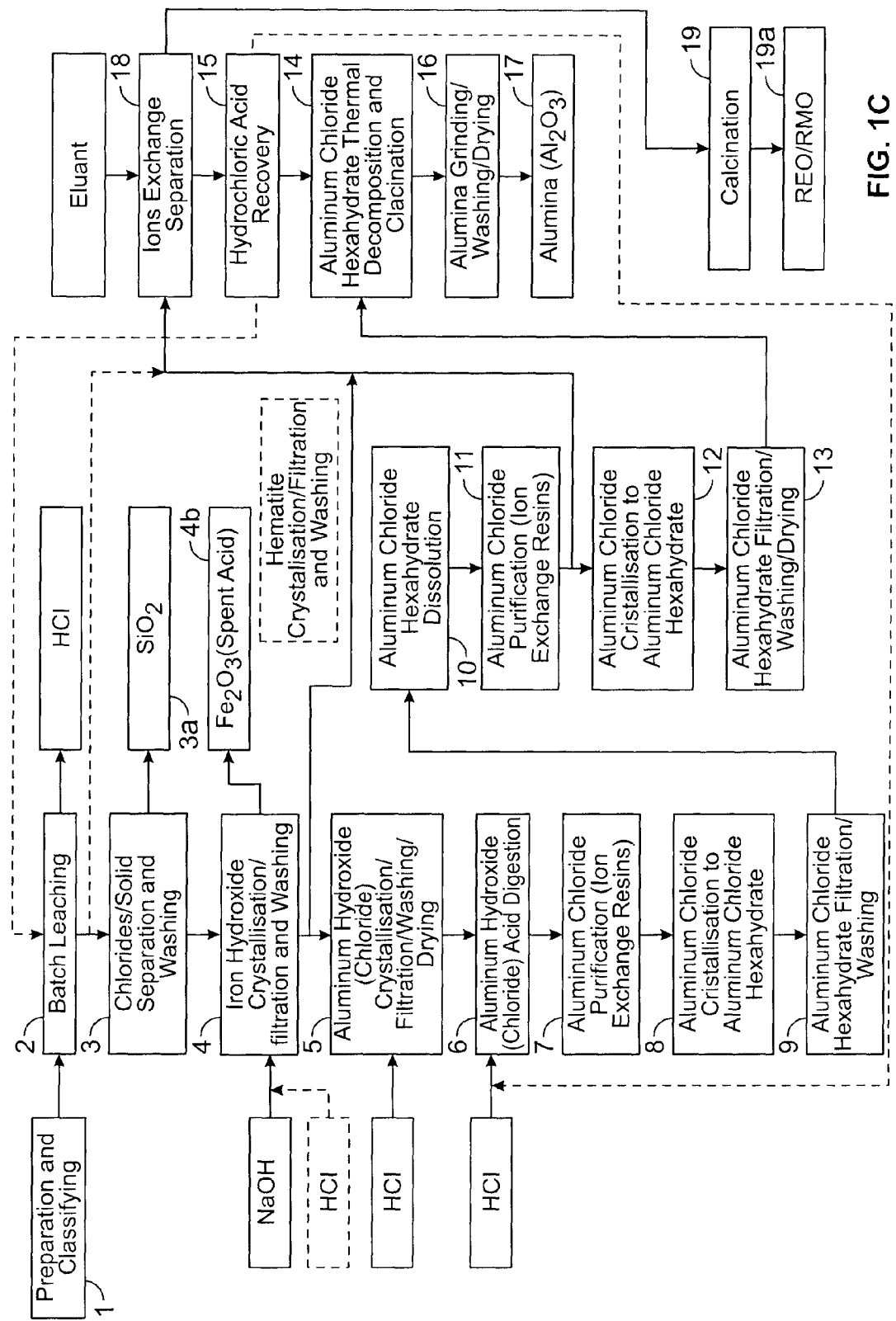

Purification of Aluminum Ions Extracted from an Aluminum-Containing Material Sample Argillite The argillite is ground up in the wet phase in a ball grinder (see (1) in FIGS. 1A, 1B and 1C). The mixture of water and roughly crushed argillite coming from the mine is fed into the grinder, where the mineral is reduced to less than 100 microns. The mud falls by gravity into a mixer outfitted with two impellers, which ensures a good homogeneity. When the mixture reaches the desired density, the contents of the mixer are pumped to an accumulation bunker, which will serve to feed the mud to the autoclave. When the bunker has reached the quantity of mud needed for the next batch, the grinding is put on hold.

Acid

The acid fed to the leaching (2) comes from two sources. The major portion is recycled spent acid coming from the high-purity alumina process. This acid contains around 20 to 22 wt. % of hydrochloric acid (HCl) and 10 to 11% of $AlCl_3$. If excess acid is required, a small quantity of fresh 36% acid is used.

Leaching

The mud of argillite and acid is fed to the autoclave of 32 $m^3$ in stoichiometric proportion. The autoclave is then hermetically sealed, mixed well and heated by indirect contact with the steam-fed jacket. As the temperature rises, the steam pressure increases such that the reaction reaches a temperature of 175° C. and a pressure of around 7.5 barg. At the end of the leaching cycle, the metals contained in the argillite are converted into chloride. The mixture is then cooled by indirect contact with the cooling water in the reactor jacket. When the mixture reaches 70 to 80° C., the leached mud is transferred by air pressure to two buffer reservoirs maintained in communicating vessels. Then the reactor is empty, another leaching cycle can commence.

Silica Mud

The leached mud contains a solid phase that is principally purified silica ($SiO_2$) (3a) in suspension in a solution of various metal chlorides. The mud is kept in suspension in the reservoirs by an impeller. The mud is fed continuously to two filter presses operating in duplex mode for separation purposes (3).

Silica Filtration

The two filter presses are identical and operate in fully automated manner. The functions of opening, closing, and emptying the cake are mechanized, and also a set of automatic cocks makes it possible to control the flow rate of the fluids. Each filter goes through the following stages, but staggered in time: preparation, filtration, compression, washing and drying, unloading of the cake to return to the preparation mode.

The preparation consists in feeding a preliminary layer of a filtering aid suspended in water. The mixture is prepared in the preliminary layer tank. With the help of a pump, the mixture is fed between the plates of the filter and returned to the tank. When the return water is clear and all the mixture has been circulated, the filter is ready for a filtration cycle.

In filtration mode, the suspension of leached mud is fed to the filter by a pump from the buffer reservoirs. The preliminary layer which is present makes it possible to hold back almost all the solid present in the mud and the resulting filtrate is free of particles in suspension. The mother liquor is sent to a buffer reservoir to be pumped to the iron precipitation stage (4). The mud accumulates between the plates until the filter pressure reaches a limit pressure.

The press then switches to compression mode. Still receiving the mud in filtration, hydraulic membranes between the filter plates are pressurized to extract more filtrate from the cake. This stage makes it possible to both maintain a more constant flow rate and to reduce the content of liquid of the cake. Finally, the press reaches its saturation. While the second press is placed in filtration mode, the first press goes into washing/drying mode.

For the washing, water is fed between the plates to displace the liquid contained in the cake. To prevent contamination of the mother liquor, the wash is returned to the buffer reservoirs and mixed in with the mud in filtration. After this, the cake is dried by passing compressed air between the plates.

Once the cycle is completed, the press is opened by the hydraulic jack and the plates are separated one by one by an automated mechanical device. During the separation of the plates, the cake will drop by gravity into a chute beneath the filter.

Neutralization of the Silica Cake

The washed cake is sent to a blade mixer in which the pH of the solid is measured. A pH greater than 6.5 is maintained by the addition of caustic soda with a dispensing pump. The neutralized and homogenized mixture is then conveyed to an open semitrailer of 20 cubic yards and then transported for disposal.

Preparation of Iron Hydroxide ($Fe(OH)_3$) and Hematite ($Fe_2O_3$)

FIGS. 1A, 1B and 10 are similar. The process of FIGS. 1A and 10 describes the production of hematite (see 4 and 4b) while the process of FIG. 1B describes the production of iron hydroxide (see 4' and 4b'). In FIG. 10, some additional steps concerning recirculation or reusing HCl are provided.

Moreover, FIG. 10 comprises additional steps 18, 19 and 20. Step 18 relates to a further passage into an ion exchange resin so as to recover at least one rare earth element and/or at least one rare earth metal (for example under the form of a chloride). In step 19, the at least one rare earth element or at least one rare earth metal is going through calcination and then an oxide form of the at least one rare earth element and/or at least one rare earth metal is recovered in step 19a.

The mother liquor is pumped at constant rate across cartridge filters to the first iron precipitation reactor (4 and 4'). This reservoir is well mixed and the temperature is controlled to 65° C. with the help of a heating coil. The pH is continuously metered and the solution is maintained at pH=12 by addition of 50% caustic soda with the help of a dispensing pump. The precipitation reaction converts the iron chloride and the other metal chlorides into hydroxides, which leads to a gradual precipitation and agglomeration of the solid crystals. Iron hydroxide can eventually be converted into hematite (see 4 and 4b). The liquor is then fed consecutively to two other precipitation reactors when the pH is also controlled by the addition of caustic soda and the temperature maintained by a coil. At the exit from the last reactor, the liquor is fed to a gravity decanter. Preparation of hematite can be carried out as described in PCT/CA2012/000541 filed on Jun. 4, 2012.

The purpose of the gravity decanter is to produce a thickened mud of the largest crystals. These crystals will serve for the seeding in the first precipitation reactor. Seeding can be used in this type of reactor to promote the creation of precipitates ((hematite) (4b) or (iron hydroxide) (4b')) that are larger and more easy to filter.

The filtration of the hematite is carried out with the help of two automated filter presses similar to those used for the silica. Please refer to the section devoted to the filtration of the silica for a functional description. The mother liquor is sent to a buffer reservoir to be pumped to the aluminum precipitation reactor.

The washed cake is sent to a blade mixer where the pH of the solid is metered. A pH less than 8 is maintained by the addition of hydrochloric acid (HCl) with the help of a dispensing pump. The neutralized and homogenized mixture is then conveyed to an open semitrailer of 20 cubic yards and transported for disposal.

Precipitation of Primary and Secondary Aluminum

The primary precipitation of the aluminum (5) can be similar to the precipitation of iron. However, the pH of the mother liquor is adjusted to 9.5 by adding HCl. Since the mother liquor has been purified of all other metals, the obtained precipitate is white and with purity of at least 98.5%.

The mother liquor is pumped at constant rate across guard filters to the first main reactor for precipitation of aluminum hydroxide (5). This reservoir is maintained in suspension by an impeller and the temperature is controlled at 65° C. with the help of a heating coil. The pH is metered continuously and the solution maintained at pH=9.5 by addition of HCl using a dispensing pump. The precipitation reaction allows for obtaining aluminum hydroxide (5), which results in a gradual precipitation and agglomeration of solid crystals. The liquor is then sent consecutively to two other precipitation reactors where the pH is also controlled by the adding of acid and the temperature maintained by a coil. At the exit from the last reactor, the liquor is fed to a gravity decanter.

A secondary precipitation can optionally be done to produce aluminum hydroxide $(Al(OH)_3)$ from the flow of aluminum chloride $(AlCl_3)$ coming from a further stage of the process described in the present disclosure. The secondary reactor is well mixed, maintained at a pH of 8.0 by addition of 50% caustic soda. The neutralization being greatly exothermal, the reactor is cooled by means of a coil. At the exit from the reactor, the secondary liquor is combined with the mother liquor to feed the main precipitation reactor.

The purpose of the gravity decanter is to produce a thickened mud of the largest crystals. These crystals are pumped from the bottom of the decanter to the first precipitation reactor to seed the crystallization.

The rest of the mud and the supernatant fluid of the decanter are sent to a repulping tank from which the mixture will be pumped to the centrifuge type separator/washer.

The mud is fed by batches to the separator. The centrifuge separator is made up of a drum turning at a speed of around 1500 revolutions per minute (rpm). This action allows the solid to be squeezed out and the liquor to be expelled at the start, followed by washing with atomization of water on the cake. The dissolved salts are than displaced into the liquid up to the acceptable purity. Once the batch is washed, the solid is fed by a conveyor, via a buffer hopper, to the plate dryer.

A plate dryer is fed continuously with the wet aluminum hydroxide. The solid cascades from one plate to another thanks to a rotating rake. Steam heats the plates and allows a gradual evaporation of the moisture from the cake. At the bottom exit from the dryer, the aluminum hydroxide contains less than 2% moisture. The powder is sent to the hopper of a pneumatic conveyor system in dilute phase. The powder is then conveyed to the storage silos of the HPA process.

Dissolution of $(Al(OH)_3)$/Crystallization of $AlCl_3$

Aluminum hydroxide $(Al(OH)_3)$ (2 wt. % moisture, maximum 5 wt. %) was fed in a first reactor for example with the help of a dispensing system that combines a pneumatic system and a loading screw. The pneumatic part of the dispensing system enables a fluidization of the solid and facilitates its flow to the loading screw. The reaction of dissolving (or digesting) the aluminum hydroxide, activated by heat, occurs in the presence of concentrated hydrochloric acid (37 wt. % HCl), spent acid, and purified water (6).

A loading sequence is used during the filling of the first reactor. First of all, purified water coming from a nano water sector is fed to the reactor. After this, an acid is added: for example fresh acid (37% HCl). The acid can also comprise spent acid coming for example from washing residue of the strainer of a first crystallizer (dilute HCl) (8) and/or from on the other hand filtrate from the filtration at the exit from a second crystallizer (12) (rich in aluminum chloride). In (6), water and acid are added to the reactor in such proportions that the resulting solution attains a concentration of 9.5 M (29.3 wt. %). When the level of liquid in the reactor is sufficient to cover the first level of agitator blades, the feeding of solid (hydroxide) begins. The dissolution reactor is double-wall and the input of heat comes via saturated steam. The reactor is likewise outfitted with baffles as well as a two-level bladed agitator of turbine type to ensure the uniform dispersion of the solid in the acid solution and facilitate the dissolving of the $Al(OH)_3$. In this digesting reactor in (6), the aluminum hydroxide, under the action of the hydrochloric acid, is transformed into aluminum chloride $(AlCl_3)$. The reaction is activated by heat and lasts about 3 hours (operating temperature of about 90 to about 110° C.) transform the aluminum hydroxide into aluminum chloride. The event of the digester can also connected to the events collector and sent to the central purifier.

Once the hydroxide is dissolved, the solution of aluminum chloride is temporarily transferred to a tank where more than one batch can built up before moving on to the crystallization. At the exit from this tank, the solution of aluminum chloride can be filtered and/or purified (7) to remove the residual impurities coming from the hydroxide portion of the plant (silica, iron and sodium). For example, the solution can be purified by means of at least one exchange resin such as an anion exchange resin. The anion exchange resin can be, for example, chosen from Purolite™ resins such as A830, A500, S930 and mixtures thereof. Once filtered and/or purified, the solution is sent to a crystallization/evaporation reactor, where the first crystallization stage (8) begins. This reactor is also outfitted with a steam-heated external exchanger, a cold water condenser, and a recirculation pump allowing the contents of the reactor to be put through the exchanger. The condenser of the crystallizer is connected to a vacuum pump to ensure a vacuum during the reaction. Under the action of vacuum and heat, a major portion of the water is evaporated or incorporated into the structure of the crystals (50% or more). In the crystallizer, the aluminum chloride is bound to water molecules to form aluminum chloride hexahydrate ($AlCl_3.6H_2O$), thus forming solid crystals. The crystallization makes it possible to separate the aluminum chloride from impurities which are always present in the solution. The speed of crystallization is controlled so as to minimize the impurities trapped inside the crystals. The evaporation stage lasts approximately about 0.5 to about 6 hours at 80° C. In this stage, the water fraction removed by evaporation is sent to an absorption column to treat the residual acid fumes before being vented into the atmosphere.

After this, the solution containing 35 wt. % of solid can optionally be drained through the bottom of the reactor and pumped to the second stage of the first crystallization. Fresh acid (HCl 37 wt. %) can be added to reach a concentrated solution of 20 wt. % of acid. During this second stage, the adding of acid lowers the solubility of the aluminum chloride and causes it to crystallize. The crystallization yield may vary from 50 to 84 wt. %. The event of the crystallizer can also connected to the events collector and sent to the central purifier.

Once the crystallization (8) is finished, the solution rich in crystals of aluminum chloride hexahydrate is transferred to an agitated reactor. From this tank, the solution is gradually fed to a band filter where it is filtered under vacuum (9). The first portion of the filtrate, containing residual impurities (NaCl, $FeCl_3$) as well as acid and aluminum chloride, is returned to the leaching of the hydroxide section of the plant. A washing with concentrated hydrochloric acid is done during the filtration, making it possible to separate and recover the uncrystallized aluminum chloride. The washing residue is sent to a tank before being reused in the previously mentioned digestion. Once the cake has been removed, the filter band is washed with nano water in order to keep the equipment free of contaminants. The box beneath the filter band is connected to a fan drawing the vapors (water and acid) released by the solution being filtered. The exit of this fan is connected to the events collector and sent to the main purifier.

Once the product of the first $AlCl_3$ crystallization is filtered (90 wt. % solid), it is fed to a second digestion reactor. The crystals of aluminum chloride hexahydrate are solubilized (10), in presence of purified water (nano water) to reform aluminum chloride. This solubilization makes it possible to release residual impurities which may have become trapped in the crystals during the first crystallization. The solubilization is promoted by an addition of heat and lasts about 3 hours to ensure a complete transformation. The reactor for the second dissolution is similar to the first.

Once the crystals are solubilized, the solution is drained through the bottom of the reactor and filtered and/or purified to remove residual impurities. Purification (11) can be carried by means of an ion exchange resin such as an anion exchange resin. The anion exchange resin can be, for example, chosen from Purolite™ resins such as A830, A500, S930 and mixtures thereof. After this filtration, the solution of aluminum chloride is sent to two tanks, used alternately, for a first quality inspection. These tanks have an inclined bottom to facilitate complete emptying of the tank between batches. Moreover, the event of these tanks is connected to the events collector and sent to the central purifier. Once the quality of the batch is approved, it is transferred to a second crystallization/evaporation (12). Similar to the first (8), this stage makes it possible to evaporate, under the action of heat and vacuum, a major portion of the water to form crystals of $AlCl_3.6H_2O$ (around 50 wt. % or more of water is evaporated or included in the crystals). After the second crystallization, the solution of hexahydrate is transferred to an agitated tank before being gradually fed to the band filter (13). The crystals are filtered under vacuum and rinsed with concentrated hydrochloric acid (37 wt. %). The entire filtrate is recovered to be used in the first digestion. After the filtration, the crystals are dried and kept in two silos, used alternately, to ensure a control of the quality. All the stages of the second crystallization are done under an inert atmosphere (nitrogen atmosphere) to preserve the purity of the product.

After the second crystallization (12), the aluminum chloride hexahydrate is filtered, washed and dried sent by batch to a stage of thermal decomposition and calcination (14) where the acid and water are evaporated to be recovered at the acid regeneration section (15). The decomposition/calcination is done in a rotary furnace at variable speed where the temperature gradually rises from 300° C. at the entry to reach around 1250° C. at its maximum. Cooling of the alumina is done inside the furnace in order to reach an exit temperature less than 100° C. By heating the crystals of aluminum chloride hexahydrate, the residual water and HCl coming from the washing solution are evaporated. Once the temperature of decomposition is reached (about 170° C.), the crystals are transformed into aluminum oxide, giving off water and HCl. When the temperature becomes greater than 300° C., calcination of the aluminum hydroxide makes it possible to generate alumina ($Al_2O_3$) giving off water vapor as the reaction product. The two reactions are done under nitrogen atmosphere to ensure there is no contamination by infiltrations of external air. The water and acid vapors generated by the decomposition/calcination are recovered to be sent to the acid regeneration stage (15). The furnace operates under constant vacuum to ensure a stable flow rate of vapors to the regeneration. A vacuum pump generates the vacuum. The feeding of the rotary furnace is done by a double rotary valve which is tight to prevent escape of acid fumes or entry of external air. The inside of the furnace is lined with alumina to prevent contamination of the product in event of wear or breakage. The heating of the furnace will be done indirectly by microwave or by radiant heating (gas/electricity).

The calcination stage (14) is followed by a grinding stage where the size of the alumina particles is mechanically homogenized (16). Water and hydrochloric acid are added to dilute all the impurities which might still be found in the process. Filtration/washing is also carried out in (16) to eliminate the impurities (very fine particles of alumina and residual acid) that will be sent on for treatment of wastes. The alumina undergoes a last thermal treatment to eliminate the residual water present after the grinding and the filtration. The temperature of the thermal treatment does not exceed 300° C. The "roasting" stage is followed by a cooling stage before the alumina is put in storage (17).

Recovery of Acid

The vapors of water and acid (HCl) generated in the stage of decomposition/calcination (14) are cooled before being brought into contact with purified water (nano-filtration) in a ceramic packed column. The resulting acid is concentrated to about 33% by weight and without impurities.

Operating Mode of the Absorption Columns

Each absorption system operates, for example, with at least three resin columns operating by three different modes, either purification, polishing or regeneration. The purification column performs the bulk of the work, consisting in eliminating the impurities, while the polishing column finishes the absorption of impurities. These first two columns operate in series. The last regeneration column is in a process of overlapping of its absorption properties. For the overlapping phase, one has at first a back-wash stage, making it possible to fluidize the resin particles in the column so as to eliminate the effects of channeling and particle segregations. After this, one moves on to the regeneration, which is done by circulating a washing solution (NaOH or HCl) through the resin. Once the regeneration is finished, one performs two rinsing stages (one slow, the other fast) with demineralized water in order to remove the washing solution, as well as the sodium ions if necessary.

Each absorption system can be outfitted with two tanks to contain the product in liquid form and the resin washing solution, respectively.

Each tank can have a pump to send the liquid to the columns at a precise flow rate and this should be done without passing a given feed pressure threshold.

For the design of the columns themselves, that is, their diameter, their height, and the quantity of resin that they contain, one can rely on the data assembled in the technical documents of Purolite™ such as those enclosed with the letter for the three different types of resin. The number of bed volumes of aluminum chloride solution can be estimated at about 300.

Example 2

Figure 2:
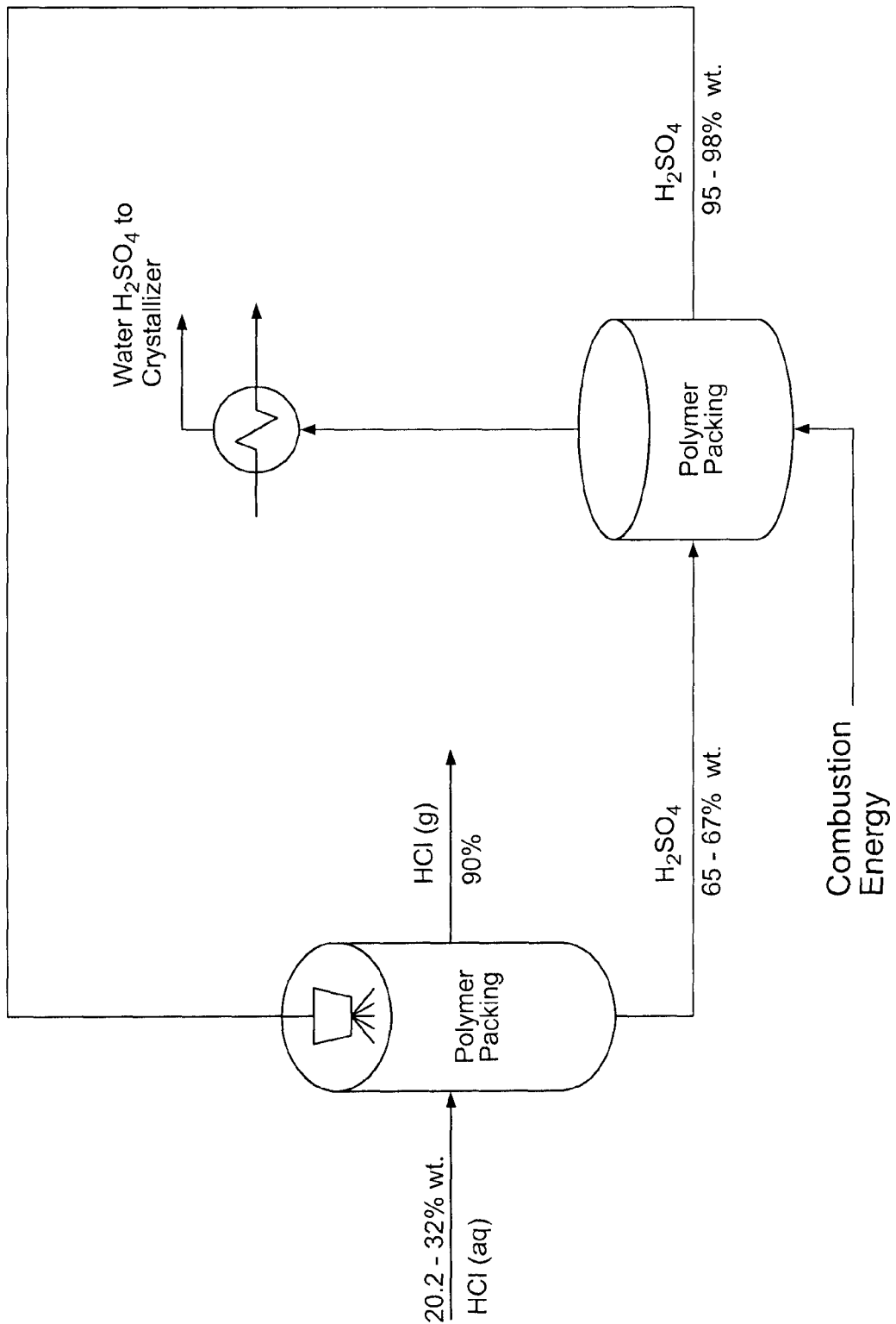
FIG. 2 is a schematic representation of an example of a process for purifying/concentrating HCl according to the present disclosure.

HCl Gas Enrichment and Purification $H_2SO_4$ Route $H_2SO_4$ can be used for carrying out purification of HCl. It can be carried out by using a packing column with $H_2SO_4$ flowing counter currently (see FIG. 2). This allows for converting the recovered HCl into HCl having a concentration above the azeotropic point (20.1% wt) and increase its concentration by about 60 to about 70% at minimum.

Water is absorbed by $H_2SO_4$ and then $H_2SO_4$ regeneration is applied where $H_2SO_4$ is brought back to a concentration of about 95 to about 98% wt. Water release at this stage free of sulphur is recycled back and used for crystallization dissolution, etc. Packing of the column can comprise polypropylene or polytrimethylene terephthalate (PTT).

Combustion energy can be performed with off gas preheating air and oxygen enrichment. Oxygen enrichment: +20° C. represents flame temperature by: 400° C. maximum.

Example 3

HCl Gas Enrichment and Purification

Calcium Chloride to Calcium Chloride Hexahydrate (Absorption/Desorption Process)

Figure 3:
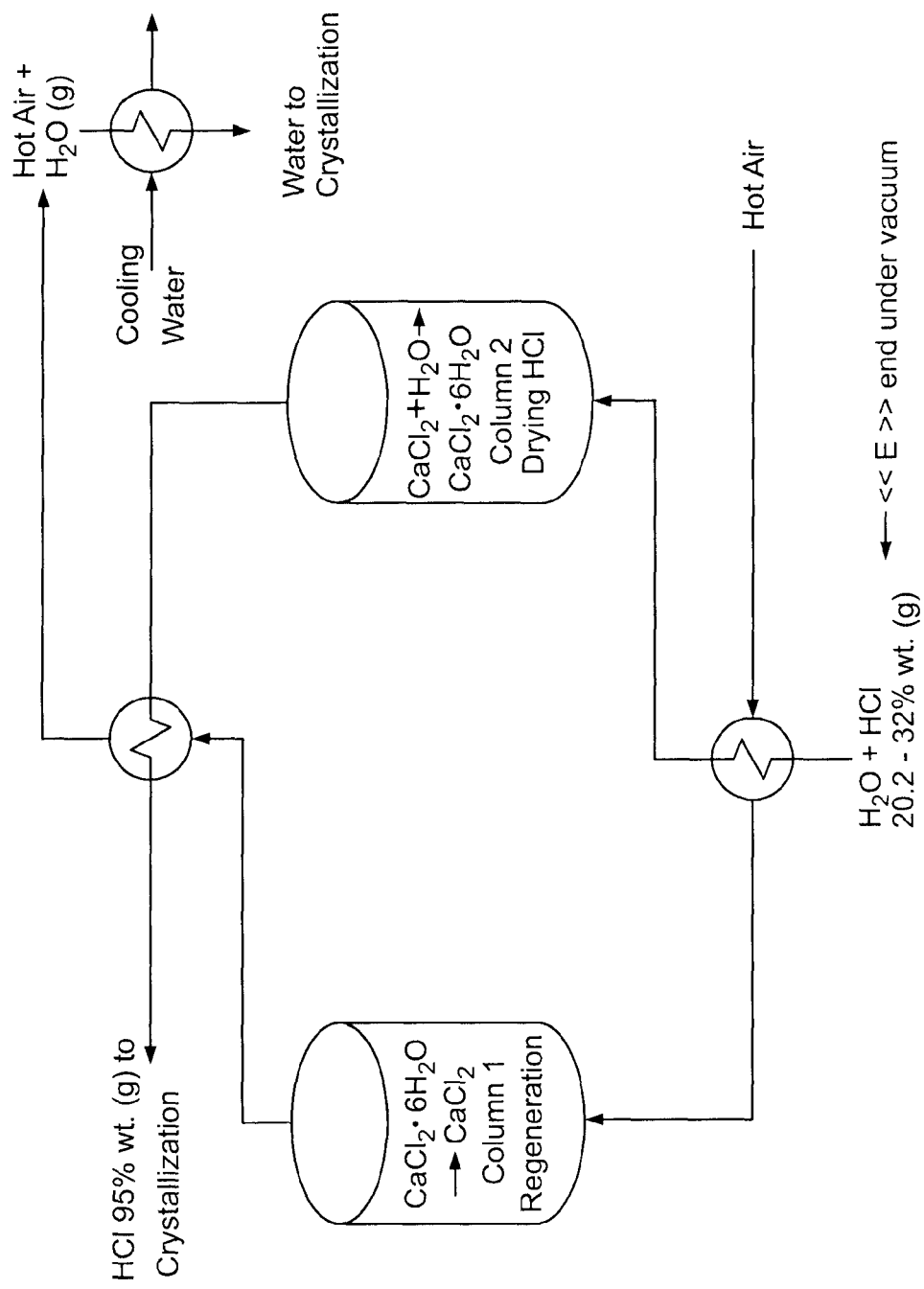
FIG. 3 is a schematic representation of an example of a process for purifying/concentrating HCl according to the present disclosure.

As shown in FIG. 3, $CaCl_2$ can be used for drying HCl. In fact, $CaCl_2$ can be used for absorbing water contained into HCl. In such a case, $CaCl_2$ is converted into its hexachloride form ($CaCl_2.6H_2O$) and one saturated system is eventually switched into regeneration mode where hot air is introduced to regenerate the fixed bed. Such an ion/exchange type process can be seen in FIG. 3 and the cycle can be inversed to switch from one column to another one. According to another embodiment, another salt can be used instead of $CaCl_2$ in order to remove water from HCl. For example, LiCl can be used.

The person skilled in the art would understand that the processes described in examples 2 and 3 can be used in various different manners. For example, these processes can be combined with the various processes presented in the present disclosure. For example, such purifications techniques can be integrated to the process shown in FIG. 1, For example, it can be used downstream of at least one of step 5, 8, 12, 13, 14 and 15 (see FIG. 1).

The person skilled in the art would also understand that the processes exemplified in example 1 can be carried out by using different starting materials i.e. aluminum-containing materials other than argillite that was used in example 1. Such other aluminum-containing materials can be, for example, those previously mentioned in the present application. The person skilled in the art would thus understand how to adapt and modify the processes described in the examples when using such a different starting material.

It was found that the processes of the present disclosure are quite efficient for producing high purity alumina. For example, it was observed that high purity alumina at purity levels of 99.99% (4N) or 99.999% (5N) can be obtained. Therefore, the processes of the present disclosure propose an interesting alternative to the existing solutions for manufacturing high purity. It was found that such processes were quite efficient and economical since allowing for recycling HCl, thereby being environmental friendly and lowering costs.

While a description was made with particular reference to the specific embodiments, it will be understood that numerous modifications thereto will appear to those skilled in the art. The scope of the claims should not be limited by specific embodiments and examples provided in the present disclosure and accompanying drawings, but should be given the broadest interpretation consistent with the disclosure as a whole.

What is claimed is:

1. A process for purifying aluminum ions comprising:
leaching an aluminum containing material chosen from an aluminum-containing ore, a recycled industrial aluminum-containing material, red mud, fly ashes, slag, alumina, aluminum hydroxide, aluminum chloride and aluminum metal with an acid so as to obtain a leachate comprising said aluminum ions and ions from at least one metal; and optionally a solid residue;
optionally separating the leachate from the solid residue;
precipitating said aluminum ions from said leachate in the form of $Al(OH)_3$ at a pH of about 7 to about 10 in order to obtain a solid comprising said $Al(OH)_3$ and a liquid comprising said ions from said at least one metal;

separating said solid from said liquid;
converting said Al(OH)₃ into AlCl₃ by reacting Al(OH)₃ with HCl and precipitating said AlCl₃;
recovering said AlCl₃; and
heating said AlCl₃ under conditions effective for converting AlCl₃ into Al₂O₃ and optionally recovering gaseous HCl so-produced.

2. The process of claim 1, wherein said pH is about 9 to about 10.

3. The process of claim 1, wherein precipitation of said aluminum ions is carried out at a temperature of about 50 to about 75° C.

4. The process of claim 1, wherein precipitating said aluminum ions in the form of Al(OH)₃ at a pH of about 7 to about 10 is carried out by reacting said aluminum ions with AlCl₃.

5. The process of claim 1, wherein a first precipitation of said aluminum ions in the form of Al(OH)₃ is carried out at said pH of about 7 to about 10 by reacting said aluminum ions with HCl and/or AlCl₃ and wherein a second precipitation of said aluminum ions in the form of Al(OH)₃ is carried out by reacting said aluminum ions with AlCl₃ in a reaction media maintained at a pH value of about 7 to about 9.

6. The process of claim 5, wherein said second precipitation is carried out by maintaining pH at a value of about 7.5 to about 8.5.

7. The process of claim 1, wherein converting said Al(OH)₃ into said AlCl₃ is carried out by reacting said Al(OH)₃ with said HCl, said HCl having a concentration of about 9 to about 10 moles per liter.

8. The process of claim 1, wherein converting said Al(OH)₃ into said AlCl₃ is carried out by reacting said Al(OH)₃ with said HCl at a temperature of about 80 to about 120° C.

9. The process of claim 1, wherein said obtained AlCl₃ is purified by means of an ion exchange resin.

10. The process of claim 1, wherein said AlCl₃ is precipitated in the form of AlCl₃·6H₂O at a temperature of about 100 to about 120° C.

11. The process of claim 1, wherein said AlCl₃ is precipitated in the form of AlCl₃·6H₂O, under vacuum, at a temperature of about 70 to about 90° C.

12. The process of claim 1, wherein converting AlCl₃ into Al₂O₃ is carried out by calcination.

13. The process of claim 12, wherein said calcination is carried out by injecting steam.

14. The process of claim 13, wherein steam is overheated steam.

15. The process of claim 1, wherein said aluminum ions are obtained by:
leaching said aluminum-containing material with said acid so as to obtain a composition comprising said aluminum ions and other metal ions; and
at least substantially selectively removing said other metal ions or said aluminum ions from said composition by substantially selectively precipitating said other metal ions or said aluminum ions from said composition.

16. The process of claim 1, wherein said aluminum-containing material is an aluminum-containing ore.

17. The process of claim 1, wherein said aluminum-containing material is chosen from aluminosillicate minerals, clays, argillite, nepheline, mudstone, beryl, cryolite, garnet, spinel, kaolin, bauxite and mixtures thereof.

18. The process of claim 1, wherein said aluminum-containing material is a recycled industrial aluminum-containing material.

19. The process of claim 1, wherein said aluminum-containing material is red mud or fly ashes.

20. A process for purifying aluminum ions comprising:
leaching an aluminum containing material chosen from an aluminum-containing ore, a recycled industrial aluminum-containing material, red mud, fly ashes, slag, alumina, aluminum hydroxide, aluminum chloride and aluminum metal with an acid so as to obtain a leachate comprising said aluminum ions and ions from at least one metal; and optionally a solid residue;
optionally separating the leachate from the solid residue;
precipitating said aluminum ions from said leachate in the form of Al(OH)₃ at a pH of about 7 to about 10 in order to obtain a solid comprising said Al(OH)₃ and a liquid comprising said ions from said at least one metal;
separating said solid from said liquid;
converting said Al(OH)₃ into AlCl₃ by reacting Al(OH)₃ with HCl and precipitating said AlCl₃;
recovering said AlCl₃;
heating said AlCl₃ under conditions effective for converting AlCl₃ into Al₂O₃ and optionally recovering gaseous HCl so-produced; and
converting said Al₂O₃ into aluminum.

* * * * *